United States Patent
Carr

(10) Patent No.: US 11,783,261 B2
(45) Date of Patent: Oct. 10, 2023

(54) CHANGE MANAGEMENT SYSTEM AND METHOD

(71) Applicant: Edera L3C, Washington, DC (US)

(72) Inventor: Kevin Carr, Milford, CT (US)

(73) Assignee: EDERA L3C, Washington, DC (US)

(*) Notice: Subject to any disclaimer, the term of this patent is extended or adjusted under 35 U.S.C. 154(b) by 0 days.

(21) Appl. No.: 17/405,300

(22) Filed: Aug. 18, 2021

(65) Prior Publication Data

US 2022/0058543 A1    Feb. 24, 2022

Related U.S. Application Data

(60) Provisional application No. 63/067,108, filed on Aug. 18, 2020.

(51) Int. Cl.
| | |
|---|---|
| *G06Q 10/00* | (2023.01) |
| *G06Q 10/0637* | (2023.01) |
| *G06Q 10/0631* | (2023.01) |
| *G06Q 10/105* | (2023.01) |
| *G06F 40/30* | (2020.01) |
| *G06Q 10/0635* | (2023.01) |
| *H04L 51/02* | (2022.01) |

(52) U.S. Cl.
CPC ........ *G06Q 10/0637* (2013.01); *G06F 40/30* (2020.01); *G06Q 10/0635* (2013.01); *G06Q 10/06313* (2013.01); *G06Q 10/06315* (2013.01); *G06Q 10/06316* (2013.01); *G06Q 10/06375* (2013.01); *G06Q 10/105* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 7,574,483 B1 * | 8/2009 | Alger | G06Q 10/06 709/217 |
| 9,565,246 B1 | 2/2017 | Tsypliaev | |
| 10,129,109 B2 | 11/2018 | Jayanti Venkata et al. | |
| 2004/0059611 A1 | 3/2004 | Kananghinis | |
| 2005/0097016 A1 | 5/2005 | Barnard | |

(Continued)

FOREIGN PATENT DOCUMENTS

| | | | | |
|---|---|---|---|---|
| WO | 2015193640 A1 | 12/2015 | | |
| WO | WO-2015193640 A1 * | 12/2015 | ............ | G06Q 50/01 |
| WO | 2020186300 A1 | 9/2020 | | |

OTHER PUBLICATIONS

Joe J. Marquez, Annie Downey, and Ryan Clement (Walking a Mile in the User's Shoes: Customer Journey Mapping as a Method to Understanding the User Experience, Internet Reference Services Quarterly, 20:135-150, 2015). (Year: 2015).*

(Continued)

*Primary Examiner* — Hafiz A Kassim
(74) *Attorney, Agent, or Firm* — Brian J. Colandreo; Heath M. Sargeant; Holland & Knight LLP

(57) ABSTRACT

A method, computer program product, and computing system for initiating a bespoke journey concerning a business process transition event; providing information concerning the bespoke journey to a plurality of recipients participating in the business process transition event; and monitoring the plurality of recipients to gauge sentiment concerning the bespoke journey.

21 Claims, 14 Drawing Sheets

(56) References Cited

U.S. PATENT DOCUMENTS

| | | | |
|---|---|---|---|
| 2005/0114829 A1* | 5/2005 | Robin | G06Q 10/06 717/101 |
| 2005/0125249 A1* | 6/2005 | Takubo | G06Q 40/00 705/35 |
| 2005/0187881 A1 | 8/2005 | McGiffin | |
| 2006/0020500 A1 | 1/2006 | Turner | |
| 2006/0026012 A1 | 2/2006 | Campbell | |
| 2006/0242154 A1* | 10/2006 | Rawat | G06F 16/168 |
| 2006/0259342 A1 | 11/2006 | Hartenstein | |
| 2009/0043802 A1 | 2/2009 | Appel | |
| 2010/0110933 A1* | 5/2010 | Wilcock | G06Q 10/10 370/255 |
| 2010/0150483 A1 | 6/2010 | Aida et al. | |
| 2011/0307862 A1* | 12/2011 | Abrams | G06F 8/71 717/120 |
| 2012/0047011 A1* | 2/2012 | Rippetoe | G06Q 30/02 705/14.45 |
| 2012/0179512 A1* | 7/2012 | O'Keeffe | G06Q 10/06375 705/7.37 |
| 2013/0080339 A1 | 3/2013 | Driesen et al. | |
| 2013/0144678 A1 | 6/2013 | Ramachandran | |
| 2014/0100922 A1* | 4/2014 | Aycock | G06Q 10/0639 705/7.38 |
| 2015/0161624 A1 | 6/2015 | Heath et al. | |
| 2015/0332290 A1* | 11/2015 | Gerber | G06Q 30/02 705/7.29 |
| 2015/0348163 A1* | 12/2015 | Tamblyn | H04M 3/5175 705/26.7 |
| 2016/0103856 A1 | 4/2016 | Isaacs | |
| 2016/0321583 A1 | 11/2016 | Jones et al. | |
| 2016/0343004 A1* | 11/2016 | Brink | G06Q 30/0201 |
| 2017/0039233 A1* | 2/2017 | Gauthier | G06Q 10/067 |
| 2017/0039491 A1* | 2/2017 | Gauthier | G06Q 10/067 |
| 2017/0039576 A1 | 2/2017 | Gauthier et al. | |
| 2017/0061338 A1 | 3/2017 | Mack | |
| 2017/0083916 A1* | 3/2017 | Fadli | G06Q 20/4014 |
| 2017/0236214 A1 | 8/2017 | Wang et al. | |
| 2017/0278117 A1 | 9/2017 | Wallace et al. | |
| 2018/0101854 A1* | 4/2018 | Jones-McFadden | G06F 3/0481 |
| 2018/0189691 A1 | 7/2018 | Oehrle | |
| 2018/0218385 A1* | 8/2018 | Gluck | G06F 16/9535 |
| 2019/0012629 A1 | 1/2019 | Yan | |
| 2019/0034963 A1* | 1/2019 | George | G06Q 30/0246 |
| 2019/0208060 A1* | 7/2019 | Piaggio | H04M 3/5191 |
| 2019/0259045 A1* | 8/2019 | Bower | G06Q 30/0201 |
| 2019/0340714 A1 | 11/2019 | Bennett | |
| 2019/0341027 A1* | 11/2019 | Vescovi | G10L 15/30 |
| 2020/0053030 A1* | 2/2020 | Moskowitz | H04L 51/046 |
| 2020/0074878 A1* | 3/2020 | Hertsgaard | G09B 19/00 |
| 2020/0127897 A1 | 4/2020 | Shultz | |
| 2020/0134532 A1 | 4/2020 | Yamane et al. | |
| 2020/0160237 A1 | 5/2020 | Farooq | |
| 2020/0287802 A1 | 9/2020 | Singh | |
| 2020/0349581 A1* | 11/2020 | Petluru | G10L 13/02 |
| 2021/0117573 A1 | 4/2021 | Lewbel et al. | |
| 2021/0150483 A1 | 5/2021 | Carlberg et al. | |
| 2021/0278953 A1* | 9/2021 | Jang | G06F 3/0488 |
| 2021/0318891 A1 | 10/2021 | Purkait | |
| 2021/0349865 A1 | 11/2021 | Shah et al. | |

OTHER PUBLICATIONS

Dyer, L., Henry, F., Lehmann, I., Lipof, G., Osmani, F., Parrott, D., . . . & Zahn, J. (Scaling BPM adoption: From project to program with IBM business process manager. IBM Redbooks, 2012)). (Year: 2012).*

Viktor Hangya and Richárd Farkas et al. "A comparative empirical study on social media sentiment analysis over various genres and languages," Jul. 2, 2016, Springer Science+Business Media Dordrecht 2016). (Year: 2016).*

Marquez, J. et al., "Walking a Mile in the User's Shoes: Customer Journey Mapping as a Method to Understanding the User Experience," Internet Reference Services Quarterly, 20: 135-150, (2015).

Dyer, L. et al., "Scaling BPM adoption: From project to program with IBM business process manager," IBM Redbooks, (2012).

International Search Report issued in International Application No. PCT/US2021/046259, dated Nov. 11, 2021.

International Search Report issued in International Application No. PCT/US2021/046234, dated Nov. 22, 2021.

International Search Report issued in International Application No. PCT/US2021/046251, dated Dec. 8, 2021.

International Search Report issued in International Application No. PCT/US2021/046244, dated Nov. 22, 2021.

Non-Final Office Action issued in U.S. Appl. No. 17/405,312 dated Nov. 26, 2021.

Non-Final Office Action issued in U.S. Appl. No. 17/405,283 dated Dec. 7, 2021.

Non-Final Office Action issued in U.S. Appl. No. 17/405,271 dated Dec. 10, 2021.

Final Office Action issued in related U.S. Appl. No. 17/405,312 dated May 17, 2022.

Non-Final Office Action issued in related U.S. Appl. No. 17/405,235 dated Jun. 23, 2022.

Non-Final Office Action issued in related U.S. Appl. No. 17/405,216 dated Aug. 24, 2022.

Final Office Action issued in related U.S. Appl. No. 17/405,283 dated Jul. 1, 2022.

Non-Final Office Action issued in related U.S. Appl. No. 17/405,271 dated Nov. 29, 2022.

Final Office Action issued in the related U.S. Appl. No. 17/405,235 dated Jan. 17, 2023.

Non-Final Office Action issued in the related U.S. Appl. No. 17/405,312 dated Jan. 18, 2023.

International Preliminary Report issued in related Application Serial No. PCT/US2021/046234 dated Mar. 2, 2023.

International Preliminary Report issued in related Application Serial No. PCT/US2021/046259 dated Mar. 2, 2023.

International Preliminary Report issued in related Application Serial No. PCT/US2021/046251 dated Mar. 2, 2023.

International Preliminary Report issued in related Application Serial No. PCT/US2021/046244 dated Mar. 2, 2023.

Non-Final Office Action issued in the related U.S. Appl. No. 17/405,185 dated Mar. 31, 2023.

Final Office Action issued in related U.S. Appl. No. 17/405,271 dated Jun. 28, 2023.

Final Office Action issued in the related U.S. Appl. No. 17/405,216 dated Apr. 28, 2023.

Final Office Action issued in related U.S. Appl. No. 17/405,312 dated Aug. 7, 2023.

* cited by examiner

CHANGE MANAGEMENT SYSTEM AND METHOD

RELATED APPLICATION(S)

This application claims the benefit of U.S. Provisional Application No. 63/067,108, filed on 18 Aug. 2020, the entire contents of which are incorporated herein by reference.

TECHNICAL FIELD

This disclosure relates to management systems and methods and, more particularly, to management systems and methods that manage business process transition events.

BACKGROUND

Often times, a platform is installed in a professional environment and will be in use for years, if not decades. For example, medical organizations may install record management systems or bill processing systems that are well known and well used. Unfortunately, as technology advances, these systems may not age gracefully and may become antiquated.

However, the desire to change to more updated systems may be lacking, as these systems are well known and/or tested, and the interest in taking a chance on (or learning) a new system may be a scary proposition for an organization.

SUMMARY OF DISCLOSURE

In one implementation, a computer-implemented method is executed on a computing device and includes: initiating a bespoke journey concerning a business process transition event; providing information concerning the bespoke journey to a plurality of recipients participating in the business process transition event; and monitoring the plurality of recipients to gauge sentiment concerning the bespoke journey.

One or more of the following features may be included. The business process transition event may include a business process transition event from a first business process to a second business process. The first business process may include one or more of: a first operating platform; a first software platform; a first hardware platform; a first operating environment; and a first operational system. The second business process may include one or more of: a second operating platform; a second software platform; a second hardware platform; a second operating environment; and a second operational system. The business process transition event may concern a transition event from a first business operational process to a second operational process. Monitoring the plurality of recipients to gauge sentiment concerning the bespoke journey may include: processing communications from the plurality of recipients to gauge their sentiment concerning the bespoke journey. The communications from the plurality of recipients may include one or more of: email-based communications; social media-based communications; SMS text-based communications; verbal-based communications; chatbot-based communications; and feedback-based communications. Processing communications from the plurality of recipients to gauge their sentiment concerning the bespoke journey may include: utilizing artificial intelligence to process communications from the plurality of recipients to gauge sentiment concerning the bespoke journey. Monitoring the plurality of recipients to gauge sentiment concerning the bespoke journey may include one or more of: identifying one or more implementation issues concerning the bespoke journey; identifying one or more personnel issues concerning the bespoke journey; identifying one or more location issues concerning the bespoke journey; and identifying one or more timing issues concerning the bespoke journey. One or more issues identified by monitoring the plurality of recipients to gauge sentiment concerning the bespoke journey may be addressed.

In another implementation, a computer program product resides on a computer readable medium and has a plurality of instructions stored on it. When executed by a processor, the instructions cause the processor to perform operations including initiating a bespoke journey concerning a business process transition event; providing information concerning the bespoke journey to a plurality of recipients participating in the business process transition event; and monitoring the plurality of recipients to gauge sentiment concerning the bespoke journey.

One or more of the following features may be included. The business process transition event may include a business process transition event from a first business process to a second business process. The first business process may include one or more of: a first operating platform; a first software platform; a first hardware platform; a first operating environment; and a first operational system. The second business process may include one or more of: a second operating platform; a second software platform; a second hardware platform; a second operating environment; and a second operational system. The business process transition event may concern a transition event from a first business operational process to a second operational process.

Monitoring the plurality of recipients to gauge sentiment concerning the bespoke journey may include: processing communications from the plurality of recipients to gauge their sentiment concerning the bespoke journey. The communications from the plurality of recipients may include one or more of: email-based communications; social media-based communications; SMS text-based communications; verbal-based communications; chatbot-based communications; and feedback-based communications. Processing communications from the plurality of recipients to gauge their sentiment concerning the bespoke journey may include: utilizing artificial intelligence to process communications from the plurality of recipients to gauge sentiment concerning the bespoke journey. Monitoring the plurality of recipients to gauge sentiment concerning the bespoke journey may include one or more of: identifying one or more implementation issues concerning the bespoke journey; identifying one or more personnel issues concerning the bespoke journey; identifying one or more location issues concerning the bespoke journey; and identifying one or more timing issues concerning the bespoke journey. One or more issues identified by monitoring the plurality of recipients to gauge sentiment concerning the bespoke journey may be addressed.

In another implementation, a computing system includes a processor and a memory system configured to perform operations including initiating a bespoke journey concerning a business process transition event; providing information concerning the bespoke journey to a plurality of recipients participating in the business process transition event; and monitoring the plurality of recipients to gauge sentiment concerning the bespoke journey.

One or more of the following features may be included. The business process transition event may include a business process transition event from a first business process to a second business process. The first business process may include one or more of: a first operating platform; a first software platform; a first hardware platform; a first operating environment; and a first operational system. The second business process may include one or more of: a second operating platform; a second software platform; a second hardware platform; a second operating environment; and a second operational system. The business process transition event may concern a transition event from a first business operational process to a second operational process.

Monitoring the plurality of recipients to gauge sentiment concerning the bespoke journey may include: processing communications from the plurality of recipients to gauge their sentiment concerning the bespoke journey. The communications from the plurality of recipients may include one or more of: email-based communications; social media-based communications; SMS text-based communications; verbal-based communications; chatbot-based communications; and feedback-based communications. Processing communications from the plurality of recipients to gauge their sentiment concerning the bespoke journey may include: utilizing artificial intelligence to process communications from the plurality of recipients to gauge sentiment concerning the bespoke journey. Monitoring the plurality of recipients to gauge sentiment concerning the bespoke journey may include one or more of: identifying one or more implementation issues concerning the bespoke journey; identifying one or more personnel issues concerning the bespoke journey; identifying one or more location issues concerning the bespoke journey; and identifying one or more timing issues concerning the bespoke journey. One or more issues identified by monitoring the plurality of recipients to gauge sentiment concerning the bespoke journey may be addressed.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
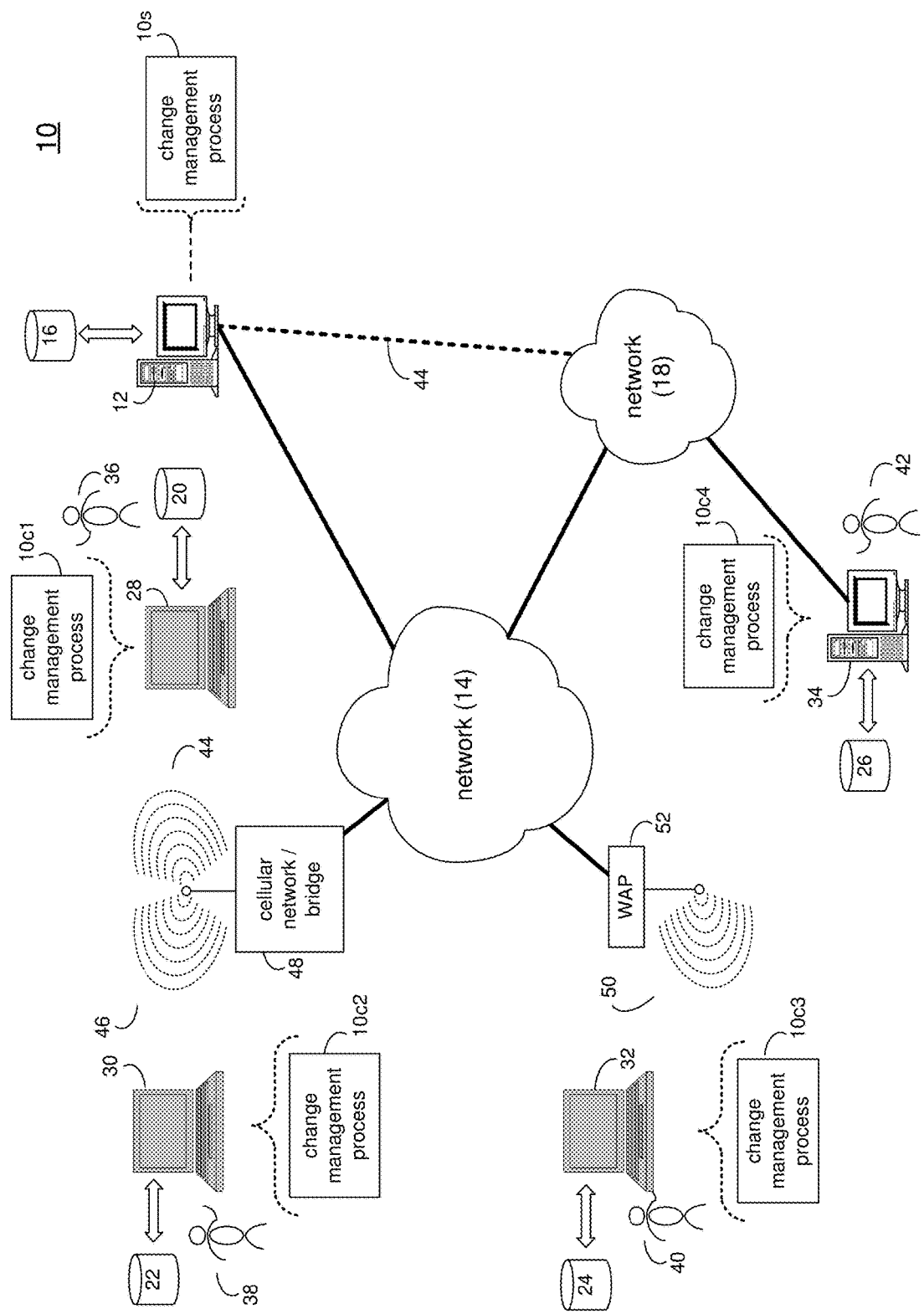
FIG. 1 is a diagrammatic view of a distributed computing network including a computing device that executes a change management process according to an embodiment of the present disclosure.

Referring to FIG. 1, there is shown change management process 10. Change management process 10 may be implemented as a server-side process, a client-side process, or a hybrid server-side/client-side process. For example, change management process 10 may be implemented as a purely server-side process via change management process 10*s*. Alternatively, change management process 10 may be implemented as a purely client-side process via one or more of change management process 10*c*1, change management process 10*c*2, change management process 10*c*3, and change management process 10*c*4. Alternatively still, change management process 10 may be implemented as a hybrid server-side/client-side process via change management process 10*s* in combination with one or more of change management process 10*c*1, change management process 10*c*2, change management process 10*c*3, and change management process 10*c*4. Accordingly, change management process 10 as used in this disclosure may include any combination of change management process 10*s*, change management process 10*c*1, change management process 10*c*2, change management process 10*c*3, and change management process 10*c*4.

Change management process 10*s* may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a cloud-based computing platform.

The instruction sets and subroutines of change management process 10*s*, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of change management processes 10c1, 10c2, 10c3, 10c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of change management processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to, a smartphone (not shown), a personal digital assistant/virtual assistant (e.g., Amazon® Alexa®, Google® Assistant®, Apple® Siri®) (not shown), a tablet computer (not shown), laptop computers 28, 30, 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, iOS™, Linux™, or a custom operating system.

Users 36, 38, 40, 42 may access change management process 10 directly through network 14 or through secondary network 18. Further, change management process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, laptop computer 28 and laptop computer 30 are shown wirelessly coupled to network 14 via wireless communication channels 44, 46 (respectively) established between laptop computers 28, 30 (respectively) and cellular network/bridge 48, which is shown directly coupled to network 14. Further, laptop computer 32 is shown wirelessly coupled to network 14 via wireless communication channel 50 established between laptop computer 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between laptop computer 32 and WAP 52. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

Change Management Process Overview

As discussed above, a platform may be installed in a professional environment (e.g., a corporate environment, a medical environment, a retail environment) and may be utilized for years (if not decades). For example, a medical organization may install a medical records management system or a medical bill processing system that may be in use for longer than its expected life cycle. In another example, a legal organization may utilize a manual paper-based storage system which is unable to provide electronic access to particular files. Further and as discussed above, such systems may not age gracefully and may become antiquated. However and due to institutional knowledge, the desire to change to a more updated and technologically advanced system may be lacking, as the installed system is well known/proven and there may be little interest in installing and learning a new system.

Figure 2:
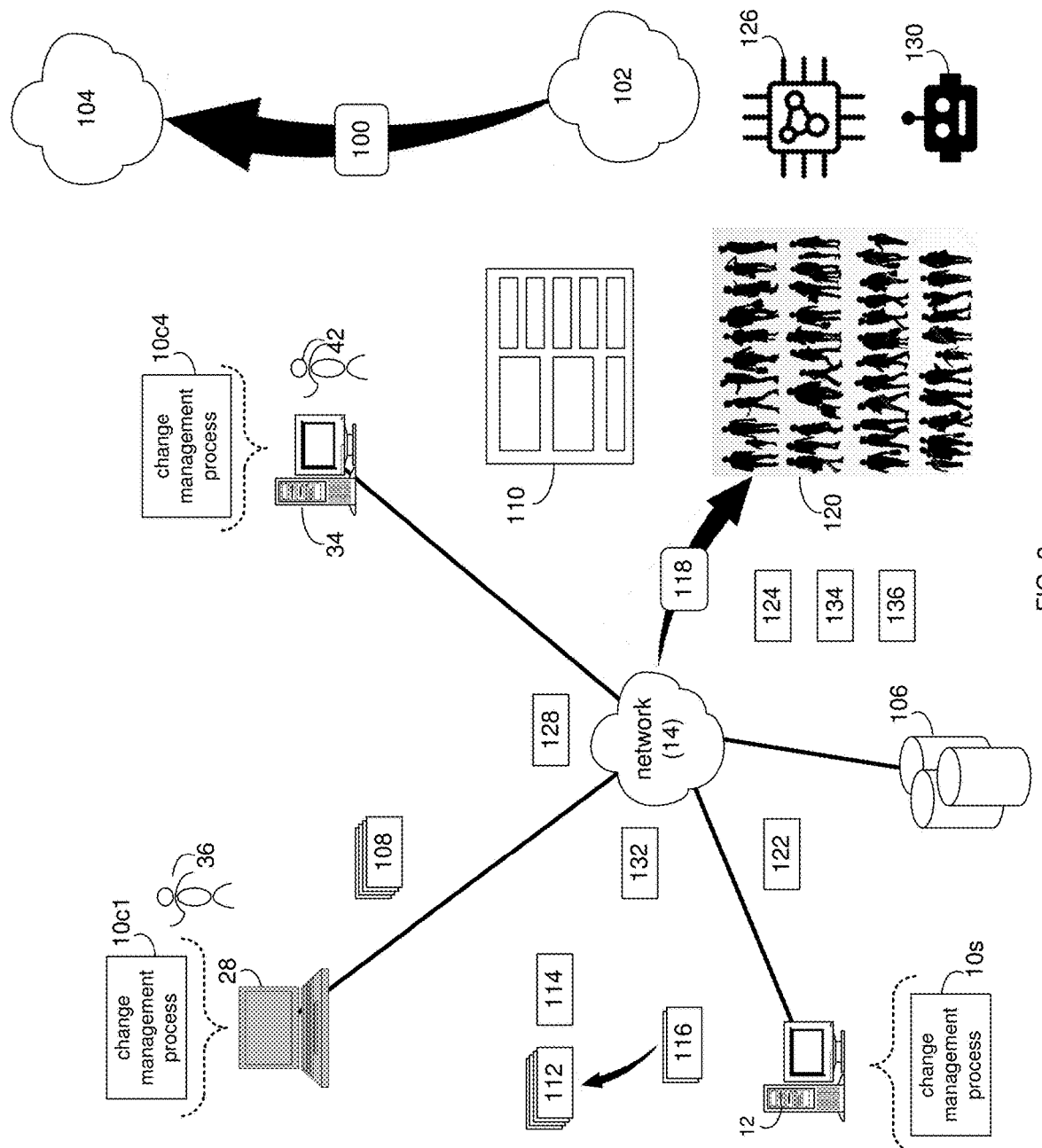
FIG. 2 is a diagrammatic view of a business process transition event to be managed by the change management process of FIG. 1 according to an embodiment of the present disclosure.

As will be discussed below in greater detail and referring also to FIG. 2, change management process 10 may manage a business process transition event (e.g., business process transition event 100) from such an older, well-known system (e.g., first business process 102) to such an updated and technologically advanced system (e.g., second business process 104). Accordingly, the business process transition event (e.g., business process transition event 100) may concern any transition event from a first business operational process to a second business operational process.

Examples of the first business process (e.g., first business process 102) may include but are not limited to one or more of: a first operating platform (e.g., a first operating system); a first software platform (e.g., a first word processing platform); a first hardware platform (e.g., a first server platform); a first operating environment (e.g., a first bill processing environment); and a first operational system (e.g., a first customer relationship management system).

Examples of the second business process (e.g., second business process 104) may include but are not limited to one or more of: a second operating platform (e.g., a second operating system); a second software platform (e.g., a second word processing platform); a second hardware platform (e.g., a second server platform); a second operating environment (e.g., a second bill processing environment); and a second operational system (e.g., a second customer relationship management system).

For the following example, assume that a client (e.g., user 42) wishes to manage a business process transition event (e.g., business process transition event 100) in which a first business process (e.g., first business process 102) is transitioned to a second business process (e.g., second business process 104). Accordingly and as will be discussed below in greater detail, the client (e.g., user 42) may utilize change management process 10 (alone or in combination with artificial intelligence engine 106) to generate a journey that will aid the client (e.g., user 42) in successfully managing such a business process transition event (e.g., business process transition event 100).

Defining the Journey

Figure 3:
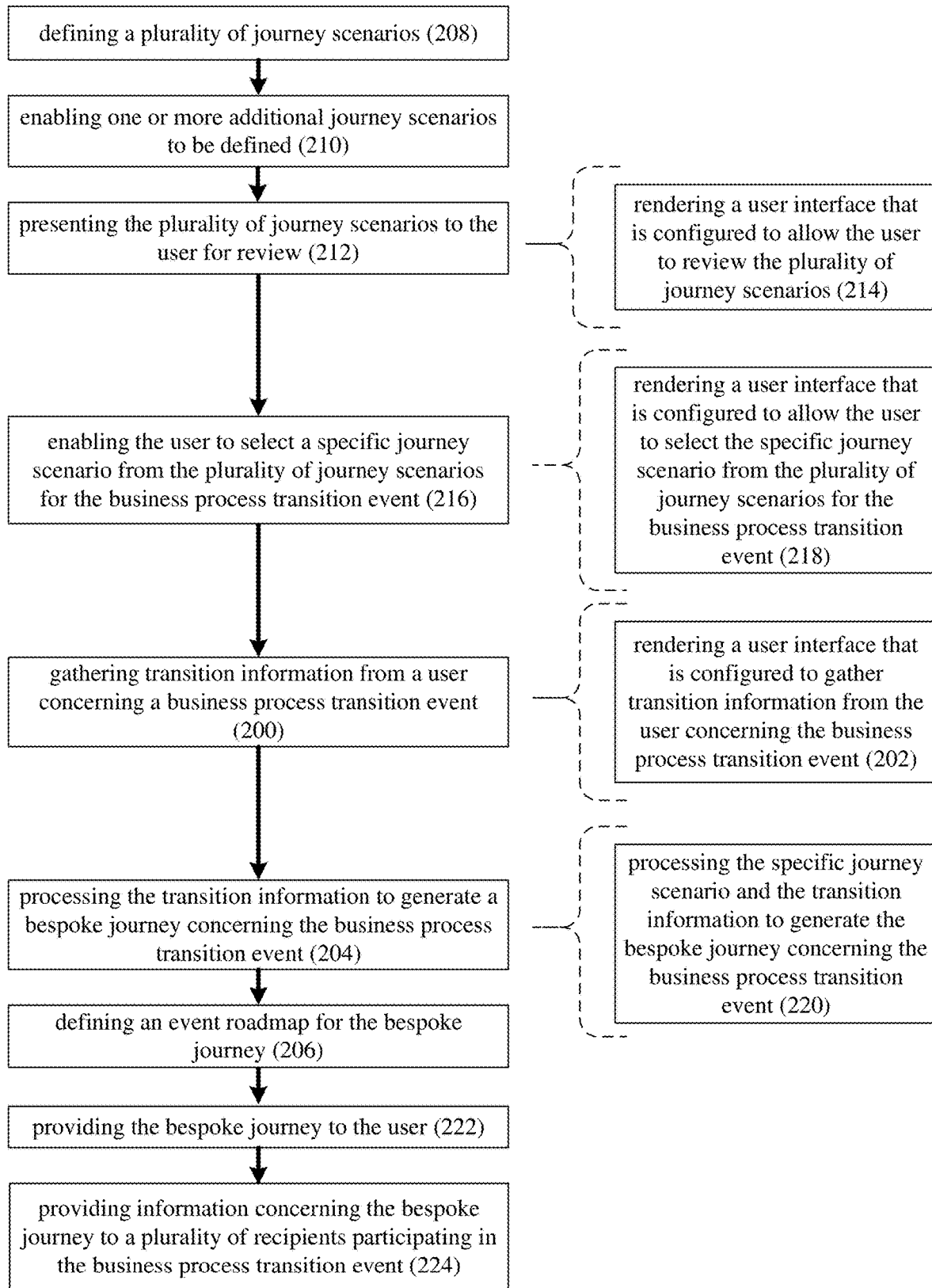
FIG. 3 is a flowchart of the change management process of FIG. 1 according to an embodiment of the present disclosure.

Referring also to FIG. 3, change management process 10 may gather 200 transition information (e.g., transition information 108) from a user (e.g., user 42) concerning a business process transition event (e.g., business process transition event 100). Change management process 10 may be utilized alone or in combination with a representative (e.g., user 36) of a company (e.g., National Coordination Center of Washington D.C.) that manages such business process transition events (e.g., business process transition event 100).

Examples of such transition information (e.g., transition information 108) gathered 200 from the user (e.g., user 42) may include but are not limited to:

information concerning the first business process (e.g., first business process 102), such as the type of operating platform (e.g., the type of operating system); the type of software platform (e.g., the type of word processing platform); the type of hardware platform (e.g., the type of server platform); the type of operating environment (e.g., the type of bill processing environment); and the type of operational system (e.g., the type of customer relationship management system);

information concerning the second business process (e.g., second business process 104), such as the type of operating platform (e.g., the type of operating system); the type of software platform (e.g., the type of word processing platform); the type of hardware platform (e.g., the type of server platform); the type of operating environment (e.g., the type of bill processing environment); and the type of operational system (e.g., the type of customer relationship management system);

timeline information (e.g., the period of time available for executing the business process transition event (e.g., business process transition event 100));

the quantity of people being impacted by the business process transition event (e.g., business process transition event 100); and the geographic diversity of the business process transition event (e.g., business process transition event 100).

When gathering 200 transition information (e.g., transition information 108) from a user (e.g., user 42) concerning a business process transition event (e.g., business process transition event 100), change management process 10 may render 202 a user interface (e.g., user interface 110) that is configured to gather transition information (e.g., transition information 108) from the user (e.g., user 42) concerning the business process transition event (e.g., business process transition event 100).

In one example, gathering 200 transition information (e.g., transition information 108) from a user (e.g. user 42) concerning a business process transition event (e.g., business process transition event 100) may include receiving information concerning particular roles and/or functionality of the first business process (e.g., first business process 102) and/or second business process (e.g., second business process 104). For example, suppose each of first business process 102 and second business process 104 are medical service platforms that include various workflows for particular users (e.g., a bill processing workflow for billing specialists; a patient interface for medical professionals; and an electronic health record access service for laboratory technicians). In this example, different users with particular roles and/or needs may utilize various portions or functionalities of first business process 102 and second business process 104.

Accordingly, change management process 10 may specify particular roles and functionality to transition from within first business process 102 to second business process 104 for business process transition event 100. As will be discussed in greater detail below, change management process 10 may process transition information 108 to generate one or more bespoke journeys concerning business process transition event 100 corresponding to particular roles and/or functionalities of second business process 104.

Figure 4:
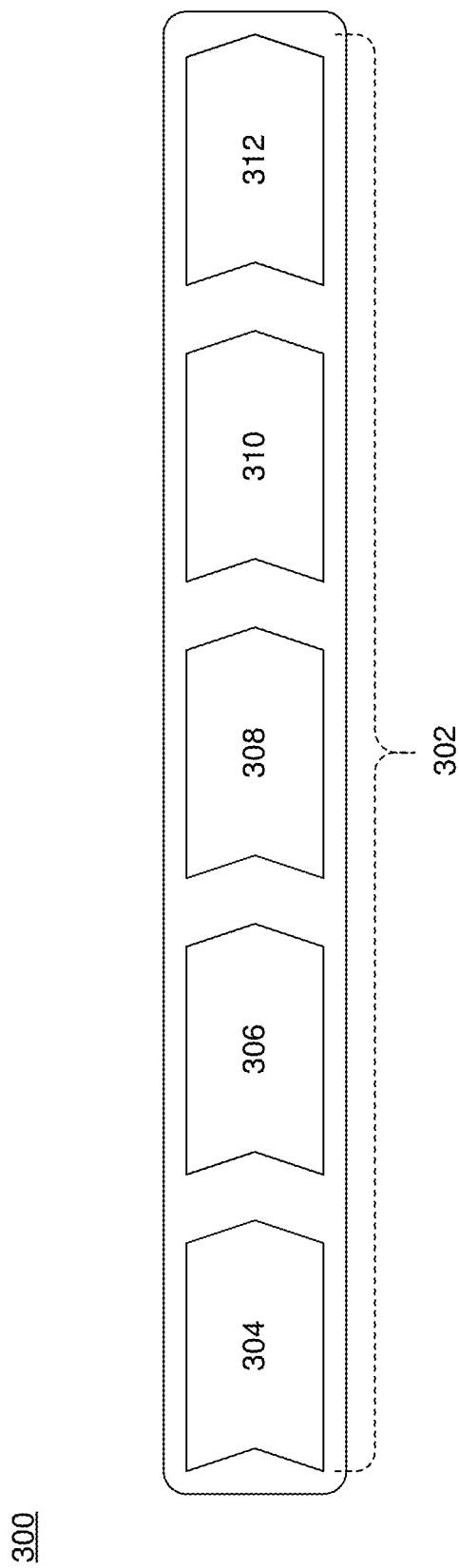
FIG. 4 is a diagrammatic view of a journey generated by the change management process of FIG. 1 according to an embodiment of the present disclosure.

Referring also to FIG. 4, change management process 10 may process 204 the transition information (e.g., transition information 108) to generate a bespoke journey (e.g., bespoke journey 300) concerning the business process transition event (e.g., business process transition event 100), wherein the bespoke journey (e.g., bespoke journey 300) may include an event roadmap (e.g., event roadmap 302). Accordingly and in such a configuration, change management process 10 may define 206 the event roadmap (e.g., event roadmap 302) for the bespoke journey (e.g., bespoke journey 300).

The event roadmap (e.g., event roadmap 302) may define a plurality of subevents (e.g., subevents 304, 306, 308, 310, 312) for the bespoke journey (e.g., bespoke journey 300). While the plurality of subevents (e.g., subevents 304, 306, 308, 310, 312) is shown to include five discrete subevents (e.g., subevents 304, 306, 308, 310, 312), this is for illustrative purposes only and is not intended to be a limitation of this disclosure, as other configurations are possible and are considered to be within the scope of this disclosure. For example, it is understood that the plurality of subevents (e.g., subevents 304, 306, 308, 310, 312) may include tens, hundreds or thousands of discrete subevents.

Examples of the plurality of subevents (e.g., subevents 304, 306, 308, 310, 312) may include but are not limited to one or more of:

a deadline event, wherein a deadline may be defined concerning bespoke journey 300 and/or business process transition event 100;

a milestone event, wherein a milestone may be defined concerning bespoke journey 300 and/or business process transition event 100;

a general condition event, wherein a required condition may be defined concerning bespoke journey 300 and/or business process transition event 100;

a subsequent condition event, wherein a condition may be defined that occurs after (i.e., subsequent to) a specific event concerning bespoke journey 300 and/or business process transition event 100;

a precedent condition event, wherein a condition may be defined that occurs before (i.e., prior to) a specific event concerning bespoke journey 300 and/or business process transition event 100;

a communication event (e.g., a meeting/seminar/survey/individual message/mass email) concerning bespoke journey 300 and/or business process transition event 100;

an information distribution event (e.g., a flyer/document) concerning bespoke journey 300 and/or business process transition event 100;

a training event (e.g., a seminar/class/tutorial) concerning bespoke journey 300 and/or business process transition event 100;

a feedback submission event (e.g., a form/email address/telephone number/chatbot) concerning bespoke journey 300 and/or business process transition event 100;

a discontinuation-of-use event (e.g., a notification that use of first business process 102 has ceased) concerning bespoke journey 300 and/or business process transition event 100;

an initiation-of-use event (e.g., a notification that use of second business process 104 has begun) concerning bespoke journey 300 and/or business process transition event 100; and a transition-of-use event (e.g., a notification that first business process 102 is currently being transitioned to second business process 104) concerning bespoke journey 300 and/or business process transition event 100.

Figure 5:
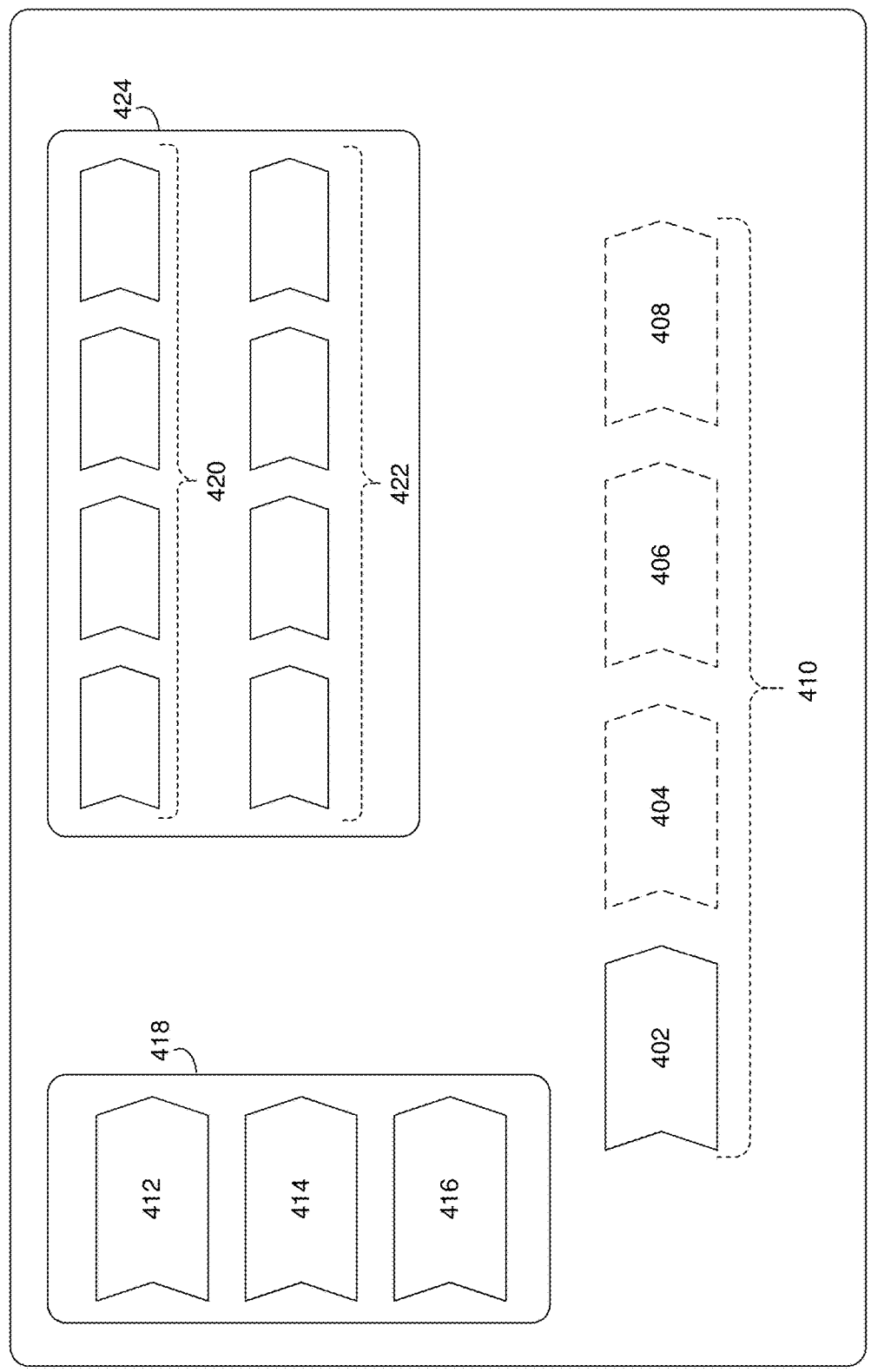
FIG. 5 is a diagrammatic view of a user interface generated by the change management process of FIG. 1 for generating a journey according to an embodiment of the present disclosure.

Defining 206 the event roadmap (e.g., event roadmap 302) for the bespoke journey (e.g., bespoke journey 300) may include receiving a selection of particular events or subevents (e.g., subevents 304, 306, 308, 310, 312) for specific journeys (e.g., bespoke journey 300). For example, a user (e.g., user 42) may build distinct journeys (e.g., bespoke journey 300) for particular roles and/or functionality. Referring also to FIG. 5, change management process 10 may provide a user interface (e.g., user interface 400) for receiving a selection of particular subevents (e.g., subevents 402, 404, 406, 408) for specific journeys. As discussed above, a bespoke journey may define an event roadmap (e.g., event roadmap 410) configured to guide a user through the business process transition event (e.g., business process transition event 100). For example, a user (e.g., user 42) may select from a listing of particular subevents (e.g., subevents 412, 414, 416) from a subevent window (e.g., subevent window 418) for inclusion in event roadmap 410. In this example, change management process 10 may provide subevents 412, 414, 416 for selection (e.g., clicking via a cursor, clicking and dragging via a cursor, etc.) in event roadmap 410. For example, change management process 10 may allow user 42 to place particular subevents 412, 414, and/or 416 within event roadmap 410. As shown in FIG. 5, subevents 404, 406, 408 are shown in dashed lines to represent subevent placeholders within event roadmap 410. While one example of event roadmap 410 is shown in FIG. 5, change management process 10 may allow for various configurations of the event roadmap to be defined within the scope of the present disclosure.

As will be discussed in greater detail below, a plurality of recipients (e.g., plurality of recipients 120) may be assigned to particular event roadmaps (e.g., event roadmap 302) for bespoke journeys (e.g., bespoke journey 300). For example, user 42 may define 206 an event roadmap for e.g., user 38 and a separate event roadmap for e.g., user 40. In some implementations, the plurality of recipients (e.g., plurality of recipients 120) may be able to provide input for specific events. For example, plurality of recipients 120 may be able to (via a user interface) select particular events to participate in. Suppose that event roadmap 302 includes a virtual training session with multiple viewing opportunities. In this example, plurality of recipients 120 may be able to select a particular virtual training session from a list of available timeslots. In this manner, change management process 10 may allow a user to define event roadmaps (e.g., event roadmap 302) for a bespoke journey (e.g., bespoke journey 300) with the option to receive input from the plurality of recipients (e.g., plurality of recipients 120) for selection of particular events or subevents.

In order to aid/guide the user (e.g., user 42) with respect to the generation the bespoke journey (e.g., bespoke journey 300) concerning the business process transition event (e.g., business process transition event 100), change management process 10 may define 208 a plurality of journey scenarios (e.g., plurality of journey scenarios 112). Examples of the plurality of journey scenarios (e.g., plurality of journey scenarios 112) may include but are not limited to a plurality of predefined journey shells that may be reviewed and/or selected and/or populated by the user (e.g., user 42), wherein each of the plurality of journey scenarios (e.g., plurality of journey scenarios 112) may define a common business process transition event, examples of which may include but are not limited to:

Journey Scenario 1: A business process transition event from Electronic Billing Platform A→Electronic Billing Platform B;

Journey Scenario 2: A business process transition event from Electronic Billing Platform A→Electronic Billing Platform C;

Journey Scenario 3: A business process transition event from Electronic Medical Records Platform X→Electronic Medical Records Platform Y;

Journey Scenario 4: A business process transition event from Electronic Medical Records Platform X→Electronic Medical Records Platform Z;

Journey Scenario 5: A business process transition event from Document Management Platform M→Document Management Platform N; and Journey Scenario 6: A business process transition event from Document Management Platform M→Document Management Platform O.

Referring again to FIG. 5 and in some implementations, change management process 10 may select from a plurality of journey scenario shells (e.g., plurality of journey scenarios 112) to define one or more event roadmaps (e.g., event roadmap 410). In one example, change management process 10 may provide event roadmap shells (e.g., event roadmap shells 420, 422) in window 424 for a user to review and/or select and/or populate. As discussed above, change management process 10 may provide for the generation of a plurality of bespoke journeys and event roadmaps pertaining to specific roles and/or functionality of a second business process (e.g., second business process 104). Accordingly, a user (e.g., user 42) may select from event roadmap shells 420, 422 to generate particular role-based or functionality-based event roadmaps (e.g., event roadmap 410).

Change management process 10 may enable 210 one or more additional journey scenarios (e.g., additional journey scenarios 116) to be defined. Accordingly, change management process 10 may supplement plurality of journey scenarios 112 with one or more additional journey scenarios (e.g., additional journey scenarios 116) for use by change management process 10. Therefore and as new/updated business process transition events are identified and/or become popular, additional journey scenarios (e.g., additional journey scenarios 116) may be added to/incorporated into plurality of journey scenarios 112.

Change management process 10 may present 212 the plurality of journey scenarios (e.g., plurality of journey scenarios 112) to the user (e.g., user 42) for review (e.g., via user interface 110). For example and when presenting 212 the plurality of journey scenarios to a user (e.g., user 42) for review, change management process 10 may render 214 a user interface (e.g., user interface 110) that is configured to allow the user (e.g., user 42) to review the plurality of journey scenarios (e.g., plurality of journey scenarios 112).

Change management process 10 may enable 216 the user (e.g., user 42) to select a specific journey scenario (e.g., specific journey scenario 114) from the plurality of journey scenarios (e.g., plurality of journey scenarios 112) for the business process transition event (e.g., business process transition event 100). For example and when enabling 216 the user (e.g., user 42) to select a specific journey scenario (e.g., specific journey scenario 114) from the plurality of journey scenarios (e.g., plurality of journey scenarios 112) for a business process transition event (e.g., business process transition event 100), change management process 10 may render 218 a user interface (e.g., user interface 110) that is configured to allow the user (e.g., user 42) to select the specific journey scenario (e.g., specific journey scenario 114) from the plurality of journey scenarios (e.g., plurality of journey scenarios 112) for the business process transition event (e.g., business process transition event 100).

Accordingly and in the event that the user (e.g., user 42) wishes to manage a business process transition event (e.g., business process transition event 100) from first business process 102 (e.g., Medical Records Platform X) to second business process 104 (e.g., Electronic Medical Records Platform Y), the user (e.g., user 42) may select Journey Scenario 3 (e.g., specific journey scenario 114) from the plurality of journey scenarios (e.g., plurality of journey scenarios 112), as Journey Scenario 3 concerns a business process transition event from Electronic Medical Records Platform X→Electronic Medical Records Platform Y.

When processing 204 the transition information (e.g., transition information 108) to generate a bespoke journey (e.g., bespoke journey 300) concerning the business process transition event (e.g., business process transition event 100), change management process 10 may process 220 the specific journey scenario (e.g., specific journey scenario 114) and the transition information (e.g., transition information 108) to generate the bespoke journey (e.g., bespoke journey 300) concerning the business process transition event (e.g., business process transition event 100).

Once the bespoke journey (e.g., bespoke journey 300) is generated, change management process 10 may provide 222 the bespoke journey (e.g., bespoke journey 300) to the user (e.g., user 42), thus allowing the user (e.g., user 42) to review and implement the same. Additionally, change management process 10 may provide 224 information (e.g., information 118) concerning the bespoke journey (e.g., bespoke journey 300) to a plurality of recipients (e.g., plurality of recipients 120) participating in the business process transition event (e.g., business process transition event 100).

Examples of information 118 may include but are not limited to: schedules concerning bespoke journey 300 and/or business process transition event 100, deadlines concerning bespoke journey 300 and/or business process transition event 100, timelines concerning bespoke journey 300 and/or business process transition event 100, supplemental informational resources concerning bespoke journey 300 and/or business process transition event 100, contact information concerning bespoke journey 300 and/or business process transition event 100, help resources concerning bespoke journey 300 and/or business process transition event 100, and informational links concerning bespoke journey 300 and/or business process transition event 100.

Using the Journey

Figure 6:
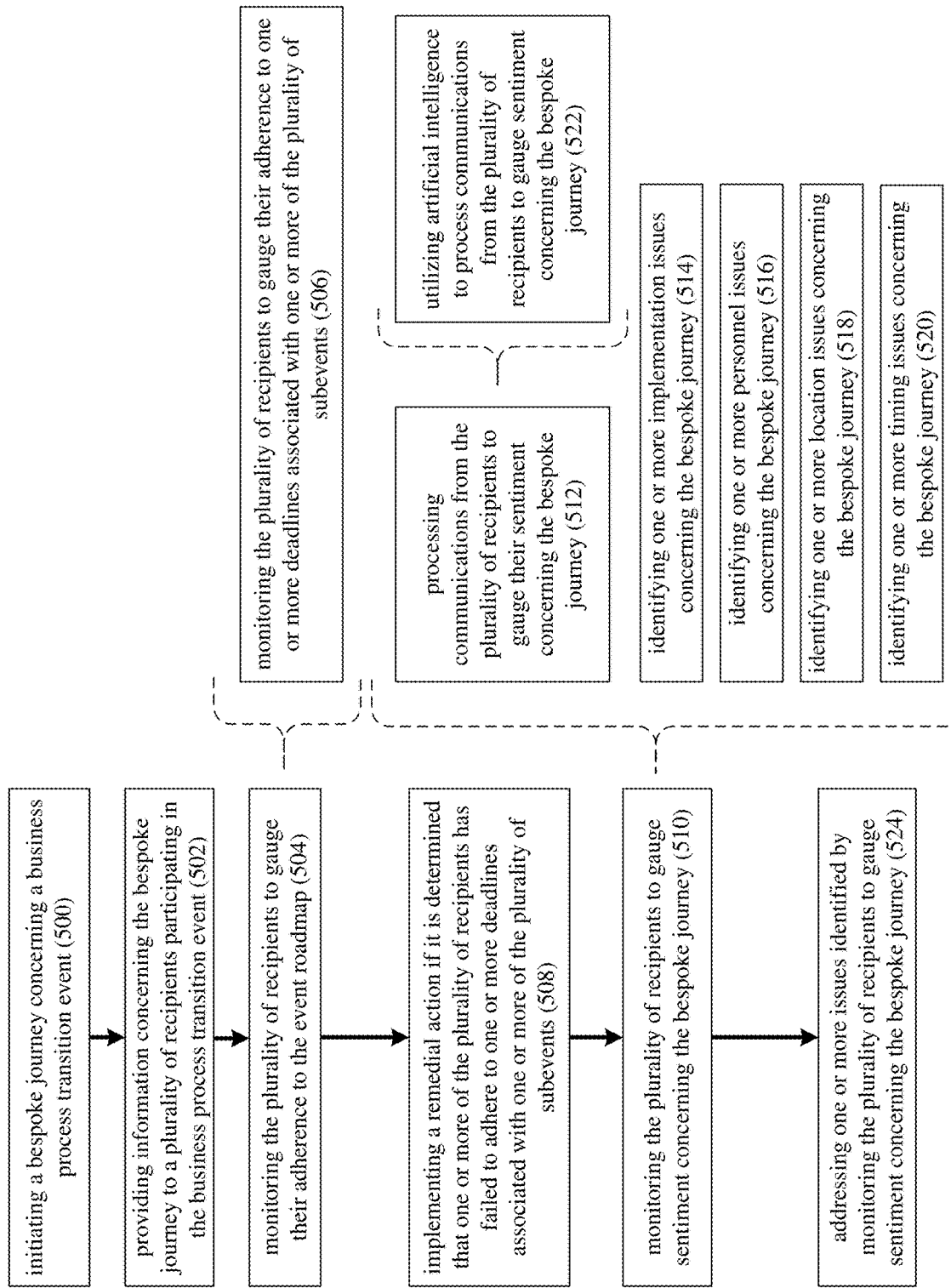
FIG. 6 is another flowchart of the change management process of FIG. 1 according to an embodiment of the present disclosure.

Referring also to FIG. 6 and once the bespoke journey (e.g., bespoke journey 300) is defined in the manner described above, change management process 10 may initiate 500 a bespoke journey (e.g., bespoke journey 300) concerning a business process transition event (e.g., business process transition event 100). As discussed above, the bespoke journey (e.g., bespoke journey 300) may include an event roadmap (e.g., event roadmap 302) that may define a plurality of subevents (e.g., subevents 304, 306, 308, 310, 312) for the bespoke journey (e.g., bespoke journey 300).

As discussed above, examples of the plurality of subevents (e.g., subevents 304, 306, 308, 310, 312) may include but are not limited to one or more of:

a deadline event, wherein a deadline may be defined concerning bespoke journey 300 and/or business process transition event 100;

a milestone event, wherein a milestone may be defined concerning bespoke journey 300 and/or business process transition event 100;

a general condition event, wherein a required condition may be defined concerning bespoke journey 300 and/or business process transition event 100;

a subsequent condition event, wherein a condition may be defined that occurs after (i.e., subsequent to) a specific event concerning bespoke journey 300 and/or business process transition event 100;

a precedent condition event, wherein a condition may be defined that occurs before (i.e., prior to) a specific event concerning bespoke journey 300 and/or business process transition event 100;

a communication event (e.g., a meeting/seminar/survey) concerning bespoke journey 300 and/or business process transition event 100;

an information distribution event (e.g., a flyer/document) concerning bespoke journey 300 and/or business process transition event 100;

a training event (e.g., a seminar/class/tutorial) concerning bespoke journey 300 and/or business process transition event 100;

a feedback submission event (e.g., a form/email address/telephone number/chatbot) concerning bespoke journey 300 and/or business process transition event 100;

a discontinuation-of-use event (e.g., a notification that use of first business process 102 has ceased) concerning bespoke journey 300 and/or business process transition event 100;

an initiation-of-use event (e.g., a notification that use of second business process 104 has begun) concerning bespoke journey 300 and/or business process transition event 100; and a transition-of-use event (e.g., a notification that first business process 102 is currently being transitioned to second business use 104) concerning bespoke journey 300 and/or business process transition event 100.

Change management process 10 may provide 502 information (e.g., information 118) concerning the bespoke journey (e.g., bespoke journey 300) to a plurality of recipients (e.g., plurality of recipients 120) participating in the business process transition event (e.g., business process transition event 100). Examples of information 118 may include but are not limited to: schedules concerning bespoke journey 300 and/or business process transition event 100, deadlines concerning bespoke journey 300 and/or business process transition event 100, timelines concerning bespoke journey 300 and/or business process transition event 100, supplemental informational resources concerning bespoke journey 300 and/or business process transition event 100, contact information concerning bespoke journey 300 and/or business process transition event 100, help resources concerning bespoke journey 300 and/or business process transition event 100, and informational links concerning bespoke journey 300 and/or business process transition event 100.

In one example, when initiating 500 a bespoke journey (e.g., bespoke journey 300) concerning a business process transition event (e.g., business process transition event 100), change management process 10 may receive a selection of particular recipients (e.g., plurality of recipients 120) and/or specific event roadmaps (e.g., event roadmap 302) for a business process transition event (e.g., business process transition event 100). For example and as discussed above, change management process 10 may generate or create event roadmaps (e.g., event roadmap 302) for one or more bespoke journeys (e.g., bespoke journey 300) for particular roles of the plurality of recipients (e.g., plurality of recipients 120) and/or functionalities of a second business process (e.g., second business process 104). In response to selecting particular roles of the plurality of recipients, change management process 10 may provide 502 information concerning the bespoke journey (e.g., bespoke journey 300) to a plurality of recipients (e.g., plurality of recipients 120) participating in the business process transition event (e.g., business process transition event 100) based upon, at least in part, the roles of plurality of recipients 120.

Providing 502 information concerning the bespoke journey (e.g., bespoke journey 300) to a plurality of recipients (e.g., plurality of recipients 120) participating in the business process transition event (e.g., business process transition event 100) may include providing each participant with at least a portion of the event roadmap (e.g., event roadmap 302) indicative of the sequence of events of business process transition event 100 concerning that recipient. In this manner, a recipient may be provided 502 with information concerning bespoke journey 300 in the form of a graphical representation of event roadmap 302 based upon, at least in part, their role and/or particular functionality the recipient is assigned to learn during business process transition event 100.

Change management process 10 may monitor 504 the plurality of recipients (e.g., plurality of recipients 120) to gauge their adherence to the event roadmap (e.g., event roadmap 302). For example, suppose that event roadmap 302 includes various communication events (e.g., mass email(s) to the plurality of recipients (e.g., plurality of recipients 120)). In this example, change management process 10 may determine whether plurality of recipients 120 of the mass email(s) read the email, deleted the email without reading the email, etc. In this manner, change management process 10 may monitor 504 the plurality recipients (e.g., plurality of recipients 120) to gauge their adherence to the event roadmap (e.g., event roadmap 302). When monitoring 504 the plurality of recipients (e.g., plurality of recipients 120) to gauge their adherence to the event roadmap (e.g., event roadmap 302), change management process 10 may monitor 506 the plurality of recipients (e.g., plurality of recipients 120) to gauge their adherence to one or more deadlines associated with one or more of the plurality of subevents (e.g., subevents 304, 306, 308, 310, 312).

Change management process 10 may implement 508 a remedial action (e.g., remedial action 122) if it is determined that one or more of the plurality of recipients (e.g., plurality of recipients 120) has failed to adhere to one or more deadlines associated with one or more of the plurality of subevents (e.g., subevents 304, 306, 308, 310, 312).

Examples of the remedial action (e.g., remedial action 122) may include but are not limited to one of more of:
  sending a reminder to e.g., one or more of the plurality of recipients 120 who are not adhering to the deadline(s) associated with one or more of the plurality of subevents (e.g., subevents 304, 306, 308, 310, 312);
  initiating an inquiry to e.g., one or more of the plurality of recipients 120 who are not adhering to the deadline(s) associated with one or more of the plurality of subevents (e.g., subevents 304, 306, 308, 310, 312);
  initiating contact with e.g., one or more of the plurality of recipients 120 who are not adhering to the deadline(s) associated with one or more of the plurality of subevents (e.g., subevents 304, 306, 308, 310, 312);
  setting a new deadline for e.g., one or more of the plurality of recipients 120 who are not adhering to the deadline(s) associated with one or more of the plurality of subevents (e.g., subevents 304, 306, 308, 310, 312);
  defining a new task for to e.g., one or more of the plurality of recipients 120 who are not adhering to the deadline(s) associated with one or more of the plurality of subevents (e.g., subevents 304, 306, 308, 310, 312);
  implementing a sub-journey for e.g., one or more of the plurality of recipients 120 who are not adhering to the deadline(s) associated with one or more of the plurality of subevents (e.g., subevents 304, 306, 308, 310, 312);
  implementing a sub-roadmap for e.g., one or more of the plurality of recipients 120 who are not adhering to the deadline(s) associated with one or more of the plurality of subevents (e.g., subevents 304, 306, 308, 310, 312);
  notifying a supervisor of e.g., one or more of the plurality of recipients 120 who are not adhering to the deadline(s) associated with one or more of the plurality of subevents (e.g., subevents 304, 306, 308, 310, 312); and
  implementing a penalty for e.g., one or more of the plurality of recipients 120 who are not adhering to the deadline(s) associated with one or more of the plurality of subevents (e.g., subevents 304, 306, 308, 310, 312).

Gauging Sentiment of Journey

As discussed above, change management process 10 may initiate 500 a bespoke journey (e.g., bespoke journey 300) concerning a business process transition event (e.g., business process transition event 100) and may provide 502 information (e.g., information 118) concerning the bespoke journey (e.g., bespoke journey 300) to a plurality of recipients (e.g., plurality of recipients 120) participating in the business process transition event (e.g., business process transition event 100).

Change management process 10 may monitor 510 the plurality of recipients (e.g., plurality of recipients 120) to gauge sentiment concerning the bespoke journey (e.g., bespoke journey 300).

For example and when monitoring 510 the plurality of recipients (e.g., plurality of recipients 120) to gauge sentiment concerning the bespoke journey (e.g., bespoke journey 300), change management process 10 may process 512 communications (e.g., communications 124) from the plurality of recipients (e.g., plurality of recipients 120) to gauge their sentiment concerning the bespoke journey (e.g., bespoke journey 300).

Examples of such communications (e.g., communications 124) from the plurality of recipients (e.g., plurality of recipients 120) that are processed 512 by change management process 10 may include but are not limited to: email-based communications; social media-based communications; SMS text-based communications; verbal-based communications; chatbot-based communications; and feedback-based communications.

Accordingly and to enable such processing 512, change management process 10 may be configured to:
  monitor (internal and/or external) email-based communications made by some or all of plurality of recipients 120;
  monitor social media-based communications made by some or all of plurality of recipients 120;
  monitor SMS text-based communications made by some or all of plurality of recipients 120;
  monitor verbal-based communications made by some or all of plurality of recipients 120;
  monitor chatbot-based communications made by some or all of plurality of recipients 120; and
  monitor feedback-based communications made by some or all of plurality of recipients 120.

Change management process 10 may process 512 communications (e.g., communications 124) from the plurality of recipients (e.g., plurality of recipients 120) to gauge their sentiment concerning the bespoke journey (e.g., bespoke journey 300) by performing sentiment analysis via one or more artificial intelligence engines/machine learning models (artificial intelligence engine 106/machine learning model 126) to define a sentiment metric associated with a recipient's communication.

As is known in the art, a machine learning model (e.g., machine learning model 126) may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the machine learning model is provided feedback that's analogous to rewards, which it tries to maximize. While three examples of machine learning approaches have been provided, it will be appreciated that other machine learning approaches are possible within the scope of the present disclosure.

In addition to machine learning models, change management process 10 may utilize other artificial intelligence engines (e.g., artificial intelligence engine 106) such as natural language processing (NLP). As is known in the art, NLP allows machines to read and understand human language. A sufficiently powerful NLP system would enable natural-language user interfaces and the acquisition of knowledge directly from human-written sources.

A sentiment metric or sentiment factor may generally include an emotional state, sentiment, or tone of text, voice, or other input from a recipient. In some implementations, "positive", "negative", and "neutral" may be examples of sentiment metrics. In some implementations, sentiment metrics may include "angry", "sad", "neutral", and "happy" emotional states. However, it will be appreciated that other sentiment metrics are possible and within the scope of the present disclosure.

In some implementations, change management process 10 may process 512 communications (e.g., communications 124) from the plurality of recipients (e.g., plurality of recipients 120) by performing sentiment analysis on communications 124. Sentiment analysis may generally include the use of computational natural language processing, text analysis, computational linguistics, and/or biometrics to systematically identify, extract, quantify, and study affective states and subjective information. In some implementations, change management process 10 may perform sentiment analysis on one or more portions of the communications (e.g., communications 124) from the plurality of recipients (e.g., plurality of recipients 120) to define the one or more sentiment metrics using a machine learning model (e.g., machine learning model 126) configured to analyze communications 124 and determine sentiment of portions of communications 124.

Change management process 10 may perform sentiment analysis on one or more portions of communications (e.g., communications 124) from the plurality of recipients (e.g., plurality of recipients 120) and determine that the one or more portions include a sentiment metric of "positive", "negative", and/or "neutral". However, it will be appreciated that performing sentiment analysis on the one or more portions of communications (e.g., communications 124) from the plurality of recipients (e.g., plurality of recipients 120) may include determining other sentiment metrics.

Further and when monitoring 510 the plurality of recipients (e.g., plurality of recipients 120) to gauge sentiment concerning the bespoke journey (e.g., bespoke journey 300), change management process 10 may:
- identify 514 one or more implementation issues concerning the bespoke journey (e.g., bespoke journey 300);
- identify 516 one or more personnel issues concerning the bespoke journey (e.g., bespoke journey 300);
- identify 518 one or more location issues concerning the bespoke journey (e.g., bespoke journey 300); and/or
- identify 520 one or more timing issues concerning the bespoke journey (e.g., bespoke journey 300).

When processing 512 communications (e.g., communications 124) from the plurality of recipients (e.g., plurality of recipients 120) to gauge their sentiment concerning the bespoke journey (e.g., bespoke journey 300), change management process may utilize 522 artificial intelligence to process communications (e.g., communications 124) from the plurality of recipients (e.g., plurality of recipients 120) to gauge sentiment concerning the bespoke journey (e.g., bespoke journey 300).

For example, change management process 10 (in conjunction with artificial intelligence engine 106) may process text-based communications (e.g., some or all of communications 124) to extract the sentiment of plurality of recipients 120 with respect to the bespoke journey (e.g., bespoke journey 300) to define a sentiment metric for the communications. Additionally/alternatively, change management process 10 (in conjunction with artificial intelligence engine 106 and natural language processing) may process voice-based communications (e.g., some or all of communications 124) to extract the sentiment of plurality of recipients 120 with respect to the bespoke journey (e.g., bespoke journey 300). For example, change management process 10 (in conjunction with artificial intelligence engine 106) may process these communications (e.g., communications 124) to extract key words (e.g., good/bad, hot/cold, early/late, awful/wonderful), wherein these key words may be analyzed to extract meaning from them, thus enabling the extraction of sentiment from these communications (e.g., communications 124).

Once the sentiment is determined, change management process 10 may address 524 one or more issues identified by monitoring the plurality of recipients (e.g., plurality of recipients 120) to gauge sentiment concerning the bespoke journey (e.g., bespoke journey 300).

As discussed above and when monitoring 510 the plurality of recipients (e.g., plurality of recipients 120) to gauge sentiment concerning the bespoke journey (e.g., bespoke journey 300), change management process 10 may:
- identify 514 one or more implementation issues concerning the bespoke journey (e.g., bespoke journey 300);
- identify 516 one or more personnel issues concerning the bespoke journey (e.g., bespoke journey 300);
- identify 518 one or more location issues concerning the bespoke journey (e.g., bespoke journey 300); and/or
- identify 520 one or more timing issues concerning the bespoke journey (e.g., bespoke journey 300).

Accordingly and when addressing 524 one or more issues identified by monitoring the plurality of recipients (e.g., plurality of recipients 120) to gauge sentiment concerning the bespoke journey (e.g., bespoke journey 300), change management process 10 may:
- address 524 one or more implementation issues identified 514 concerning the bespoke journey (e.g., bespoke journey 300), such as shortening the curriculum of a training seminar that people thought was too long;
- address 524 one or more personnel issues identified 516 concerning the bespoke journey (e.g., bespoke journey 300), such as replacing an instructor at a seminar that people thought was ineffective;
- address 524 one or more location issues identified 518 concerning the bespoke journey (e.g., bespoke journey 300), such as relocating a staff meeting from a room that people thought was drafty and cold; and/or
- address 524 one or more timing issues identified 520 concerning the bespoke journey (e.g., bespoke journey 300), such as rescheduling training session that was scheduled to last until 8:00 p.m. and people thought was too late.

In some implementations, addressing 524 the one or more issues identified by monitoring the plurality of recipients (e.g., plurality of recipients 120) to gauge sentiment concerning the bespoke journey (e.g., bespoke journey 300) may include providing automatically generated recommendations regarding the one or more issues. For example, change management process 10 may provide one or more notifications regarding the one or more issues to a user (e.g., user 42) managing the bespoke journey (e.g., bespoke journey 300), a supervisor of an individual associated with the one or more issues, and/or various participants of a particular event soliciting further feedback on the one or more issues. With the one or more notifications, change management process 10 may provide recommendations based on the one or more issues. For example, change management process 10 may:
- provide a recommendation to shorten the curriculum of a training seminar that people thought was too long;
- provide a recommendation to replace an instructor at a seminar that people thought was ineffective;
- provide a recommendation to relocate a staff meeting from a room that people thought was drafty and cold; and/or
- provide a recommendation to reschedule a training session that was scheduled to last until 8:00 p.m. and people thought was too late.

Accordingly, change management process may automatically identify and address one or more issues identified by monitoring the plurality of recipients (e.g., plurality of recipients 120) to gauge sentiment concerning the bespoke journey (e.g., bespoke journey 300).

Enabling Third-Party Feedback

Figure 7:
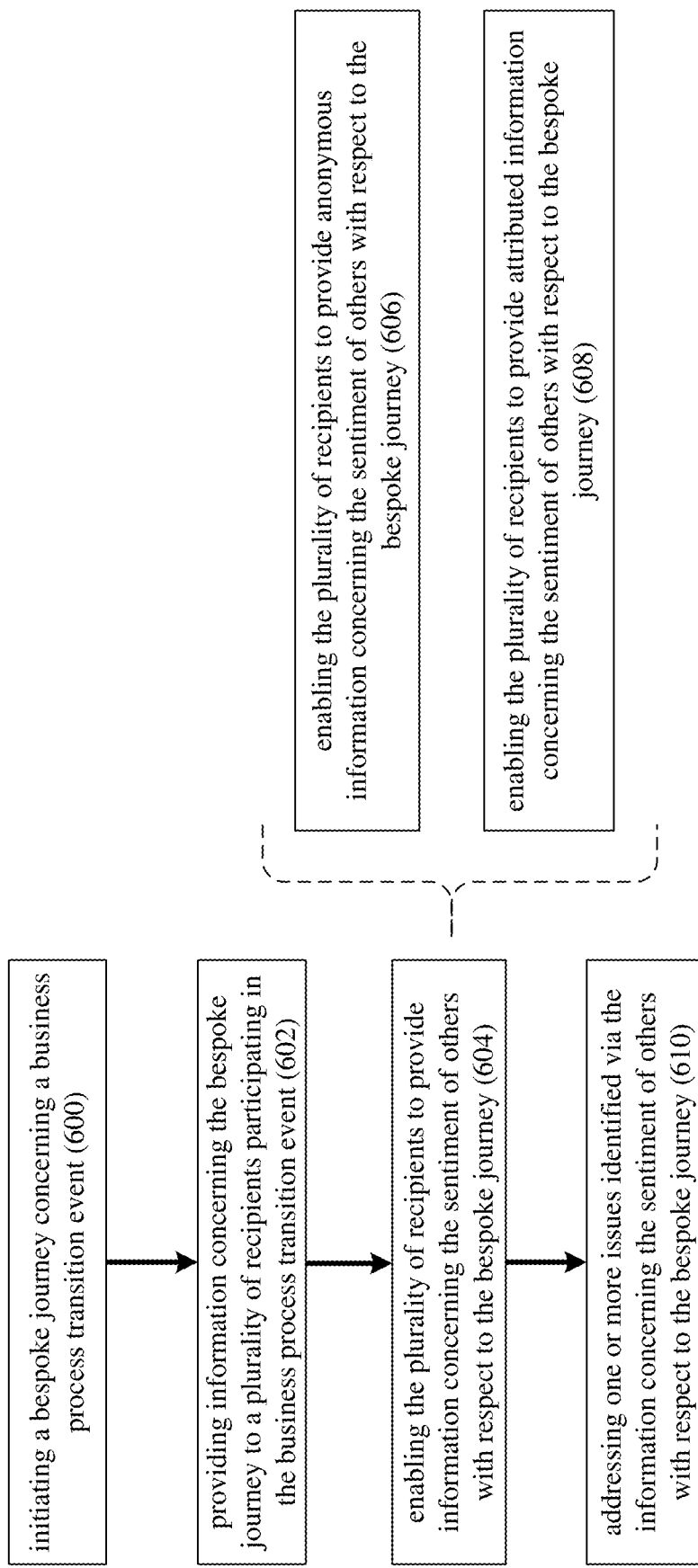
FIG. 7 is another flowchart of the change management process of FIG. 1 according to an embodiment of the present disclosure.

Referring also to FIG. 7 and as discussed above, change management process 10 may initiate 600 a bespoke journey (e.g., bespoke journey 300) concerning a business process transition event (e.g., business process transition event 100) and may provide 602 information (e.g., information 118) concerning the bespoke journey (e.g., bespoke journey 300) to a plurality of recipients (e.g., plurality of recipients 120) participating in the business process transition event (e.g., business process transition event 100).

Change management process 10 may enable 604 the plurality of recipients (e.g., plurality of recipients 120) to provide information (e.g., information 128) concerning the sentiment of others (e.g., user 40) with respect to the bespoke journey (e.g., bespoke journey 300).

For example and when enabling 604 the plurality of recipients (e.g., plurality of recipients 120) to provide information (e.g., information 128) concerning the sentiment of others (e.g., user 40) with respect to the bespoke journey (e.g., bespoke journey 300), change management process 10 may enable 606 the plurality of recipients (e.g., plurality of recipients 120) to provide anonymous information (e.g., information 128) concerning the sentiment of others (e.g., user 40) with respect to the bespoke journey (e.g., bespoke journey 300). For example, change management process 10 may provide a user interface (e.g., user interface 110) to user 38 to receive anonymous information (e.g., information 128) concerning the sentiment of user 40 with respect to the bespoke journey (e.g., bespoke journey 300). In this example, user 38 may select a particular journey event or subevent from bespoke journey 300 associated with the sentiment of user 40. For example, suppose user 38 observes that user 40 expressed frustration during a particular journey event or subevent regarding e.g., the pace of the event. In this example, user 38 may select the particular journey event or subevent from user interface 110 and provide anonymous information (e.g., information 128) concerning the sentiment of user 40 during the particular journey event or subevent.

In another example, change management process 10 may provide a virtual chatbot (e.g., virtual chatbot 130) configured to interact with a user (e.g., user 38) to receive anonymous information (e.g., information 128) concerning the sentiment of user 40. As will be discussed in greater detail below, virtual chatbot 130 may be presented in a user interface (e.g., user interface 110) and may be configured to receive anonymous information (e.g., information 128) and/or attributed information that may be selectively provided as anonymous information (e.g., via a text field and/or a voice recording submission). Accordingly, change management process 10 may be configured to allow user 38 to submit anonymous information (e.g., information 128) concerning the sentiment of user 40 with respect to the bespoke journey (e.g., bespoke journey 300) in the event that e.g., user 38 is fearful or retaliation for providing such information.

Further and when enabling 604 the plurality of recipients (e.g., plurality of recipients 120) to provide information concerning the sentiment of others (e.g., user 40) with respect to the bespoke journey (e.g., bespoke journey 300), change management process 10 may enable 608 the plurality of recipients (e.g., plurality of recipients 120) to provide attributed information (e.g., information 128) concerning the sentiment of others with respect to the bespoke journey (e.g., bespoke journey 300). For example, change management process 10 may provide a user interface (e.g., user interface 110) to user 38 to receive attributed information (e.g., information 128) concerning the sentiment of user 40 with respect to the bespoke journey (e.g., bespoke journey 300). In another example, change management process 10 may provide a virtual chatbot (e.g., virtual chatbot 130) configured to interact with a user (e.g., user 38) to receive attributed information (e.g., information 128) concerning the sentiment of user 40. Accordingly, change management process 10 may be configured to allow user 38 to submit attributed information (e.g., information 128) concerning the sentiment of user 40 with respect to the bespoke journey (e.g., bespoke journey 300) in the event that e.g., user 38 is comfortable with having their name associated with such information.

The information (e.g., information 128) concerning the sentiment of others (e.g., user 40) with respect to the bespoke journey (e.g., bespoke journey 300) may be based upon one or more of: email-based communications to and/or from user 40; social media-based communications to and/or from user 40; SMS text-based communications to and/or from user 40; and verbal-based communications to and/or from user 40.

The information (e.g., information 128) concerning the sentiment of others (e.g., user 40) with respect to the bespoke journey (e.g., bespoke journey 300) may identify:
- one or more implementation issues concerning the bespoke journey (e.g., bespoke journey 300);
- one or more personnel issues concerning the bespoke journey (e.g., bespoke journey 300);
- one or more location issues concerning the bespoke journey (e.g., bespoke journey 300); and/or
- one or more timing issues concerning the bespoke journey (e.g., bespoke journey 300) (e.g., bespoke journey 300).

Accordingly and when addressing 610 one or more issues identified via the information (e.g., information 128) concerning the sentiment of others with respect to the bespoke journey (e.g., bespoke journey 300), change management process 10 may:
- address 610 one or more implementation issues identified concerning the bespoke journey (e.g., bespoke journey 300), such as shortening the curriculum of a training seminar that people thought was too long;
- address 610 one or more personnel issues identified concerning the bespoke journey (e.g., bespoke journey 300), such as replacing an instructor at a seminar that people thought was ineffective;
- address 610 one or more location issues identified concerning the bespoke journey (e.g., bespoke journey 300), such as relocating a staff meeting from a room that people thought was drafty and cold; and/or
- address 610 one or more timing issues identified concerning the bespoke journey (e.g., bespoke journey 300), such as rescheduling training session that was scheduled to last until 8:00 p.m. and people thought was too late.

While several examples of how change management process 10 may address 610 one or more issues identified via information concerning the sentiment of others with respect to the bespoke journey (e.g., bespoke journey 300), it will be appreciated that these are for example purposes only and that change management process 10 may address identified issues in various ways within the scope of the present disclosure.

In some implementations, addressing 610 the one or more issues identified via information concerning the sentiment of others with respect to the bespoke journey (e.g., bespoke journey 300) may include providing automatically generated recommendations regarding the one or more issues. For example, change management process 10 may provide one or more notifications regarding the one or more issues to a user (e.g., user 42) managing the bespoke journey (e.g., bespoke journey 300), a supervisor of an individual associated with the one or more issues, and/or various participants of a particular event soliciting further feedback on the one or more issues. With the one or more notifications, change management process 10 may provide recommendations based on the one or more issues. For example, change management process 10 may:
- provide a recommendation to shorten the curriculum of a training seminar that people thought was too long;
- provide a recommendation to replace an instructor at a seminar that people thought was ineffective;
- provide a recommendation to relocate a staff meeting from a room that people thought was drafty and cold; and/or
- provide a recommendation to reschedule a training session that was scheduled to last until 8:00 p.m. and people thought was too late Accordingly, change management process may automatically identify and address one or more issues concerning the sentiment of others with respect to the bespoke journey (e.g., bespoke journey 300).

Defining Journey Stages and Monitoring Progress of Participants

Figure 8:
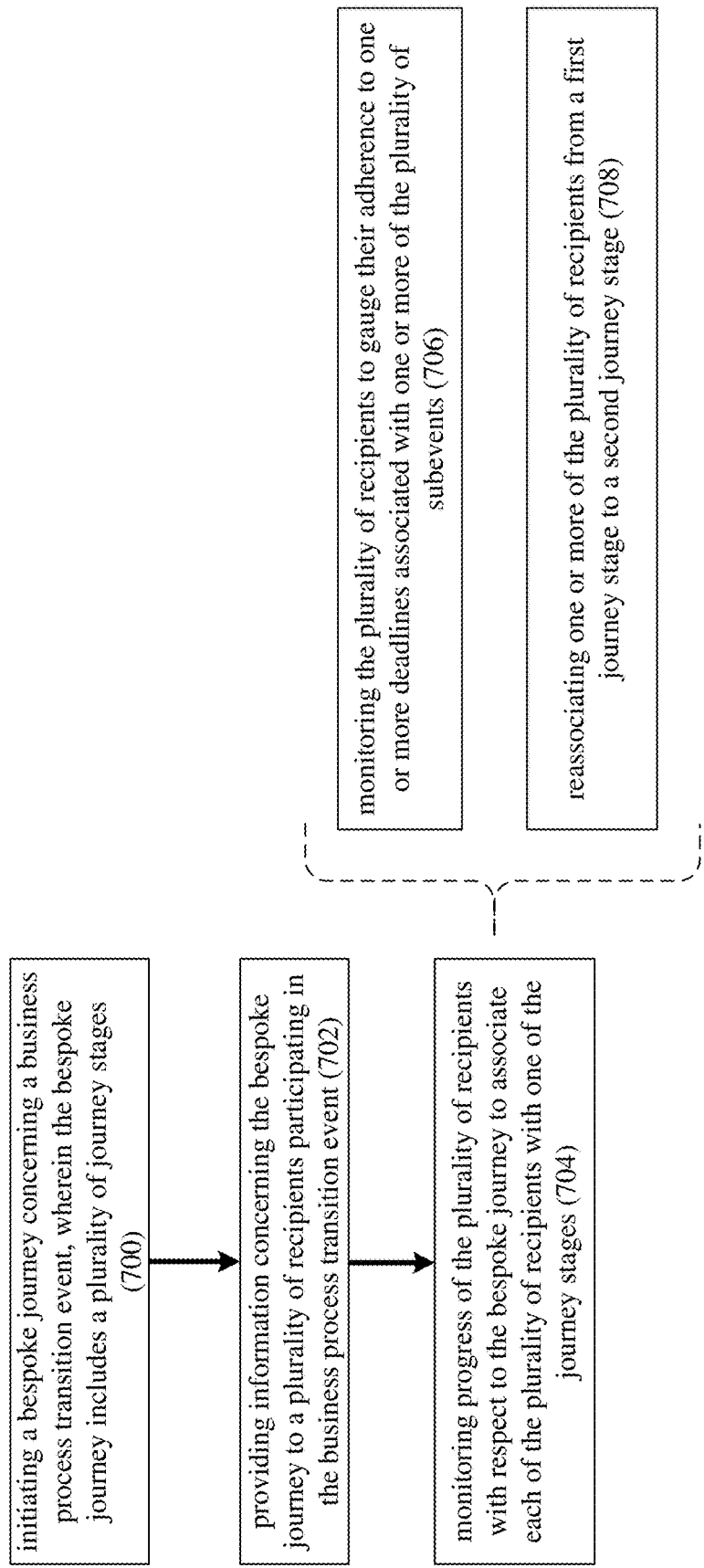
FIG. 8 is another flowchart of the change management process of FIG. 1 according to an embodiment of the present disclosure.

Referring also to FIG. 8 and as discussed above, change management process 10 may initiate 700 a bespoke journey (e.g., bespoke journey 300) concerning a business process transition event (e.g., business process transition event 100), wherein the bespoke journey (e.g., bespoke journey 300) includes a plurality of journey stages. A journey stage may generally define a discrete collection of characteristics, behaviors, or experiences that describe an individual's progress through a journey. For example, the journey stages may represent a plurality of portions or subsets of the bespoke journey (e.g., bespoke journey 300).

As discussed above, the bespoke journey (e.g., bespoke journey 300) may include a plurality of subevents (e.g., subevents 304, 306, 308, 310, 312). As discussed above, the plurality of subevents may include one or more of: a deadline event; a milestone event; a general condition event; a subsequent condition event; a precedent condition event; a communication event; an information distribution event; a training event; a feedback submission event; a discontinuation-of-use event; an initiation-of-use event; and a transition-of-use event.

Figure 9:
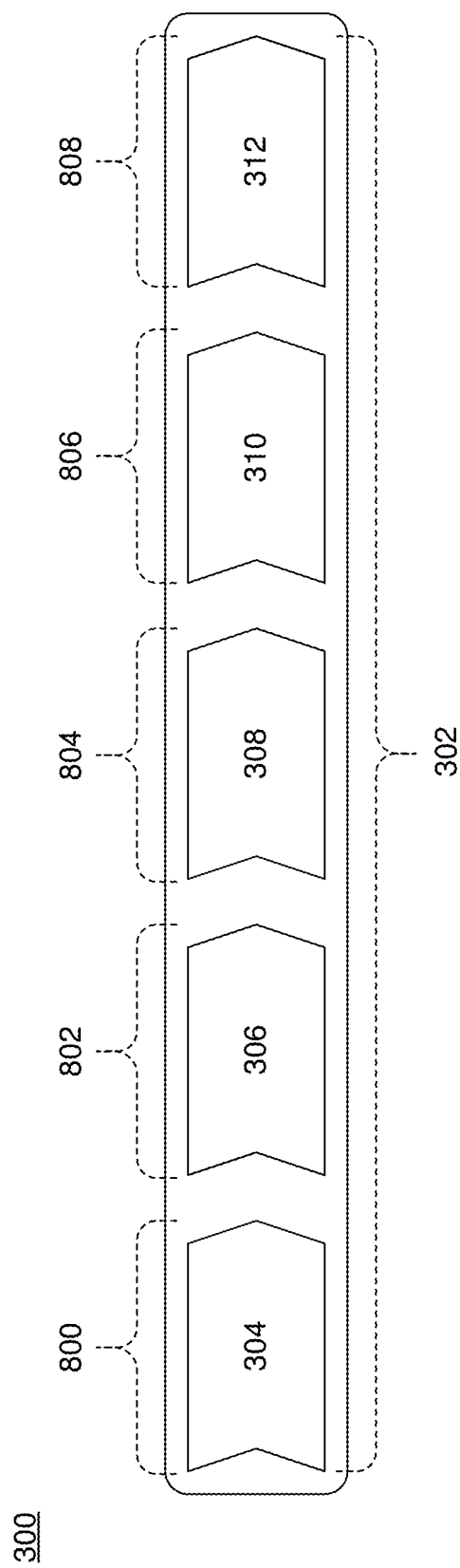
FIG. 9 is a diagrammatic view of a journey generated by the change management process of FIG. 1 with corresponding journey stages according to an embodiment of the present disclosure.

Referring also to FIG. 9 and in some implementations, when processing 208 the transition information to generate a bespoke journey (e.g., bespoke journey 300) concerning the business process transition event (e.g., business process transition event 100), a user may define (e.g., via a user interface 110) the plurality of journey stages (e.g., journey stages 800, 802, 804, 806, 808). For example, a user (e.g., user 42) may define a number of individual journey stages with particular subevents (e.g., subevents 304, 306, 308, 310, 312) of a bespoke journey (e.g., bespoke journey 300). In this example, the user (e.g., user 42) may define particular subevents and conditions associated with the subevents when defining the plurality of journey stages. While FIG. 9 shows e.g., five journey stages, it will be appreciated that bespoke journey 300 may be defined to include any number of journey stages within the scope of the present disclosure.

In some implementations, the plurality of journey events may represent behavioral benchmarks or stages of a user through the bespoke journey. For example, change management process 10 may associate portions of the bespoke journey (e.g., bespoke journey 300) with behavioral stages of the user through the bespoke journey. In one example, the journey stages may include stages of the transtheoretical model. The transtheoretical model or the "stages of change" include various discrete stages an individual experiences when making a change (e.g., precontemplation, contemplation, preparation, action, maintenance, etc.). In this example, change management process 10 may associate particular events of the bespoke journey with particular stages of change. For example, change management process 10 may receive a selection (e.g., via user interface 110) of particular events to associate with particular journey stages of the plurality of journey stages. Accordingly and as will be discussed in greater detail below, change management process 10 may monitor an individual's progress with respect to the bespoke journey to associate that individual with a particular journey stage.

The plurality of journey stages may include one or more of: a precontemplation journey stage; a contemplation journey stage; a preparation journey stage; an action journey stage; and a maintenance journey stage. Continuing with the above example, suppose that the plurality of journey stages include the above-described five stages of the transtheoretical model (e.g., a precontemplation journey stage; a contemplation journey stage; a preparation journey stage; an action journey stage; and a maintenance journey stage). In this example, a user (e.g., user 42) may associate particular subevents (e.g., subevents 304, 306, 308, 310, 312) from the bespoke journey (e.g., bespoke journey 300) with the plurality of journey stages (e.g., journey stages 800, 802, 804, 806, 808). For example, change management process 10 may provide a user interface (e.g., user interface 110) with the plurality of subevents (e.g., subevents 304, 306, 308, 310, 312) for selectively associating with the plurality of journey stages (e.g., journey stages 800, 802, 804, 806, 808). Suppose that journey stage 800 represents the precontemplation journey stage; journey stage 802 represents the contemplation journey stage; journey stage 804 represents the preparation journey stage; journey stage 806 represents the action journey stage; and journey stage 808 represents the maintenance journey stage.

In this example, suppose user 42 associates, via user interface 110, subevent 304 with precontemplation journey stage 800; subevent 306 with contemplation journey stage 802; subevent 308 with preparation journey stage 804; subevent 310 with action journey stage 806; and subevent 312 with maintenance journey stage 808. Accordingly, as a recipient of bespoke journey 300 progresses through the various subevents (e.g., subevents 304, 306, 308, 310, 312) of bespoke journey 300, change management process 10 may associate the recipient with a particular journey stage. While this example includes e.g., one subevent of bespoke journey 300 for each journey stage, it will be appreciated that any number of and/or type of subevents may be associated with any number of and/or type of journey stages within the scope of the present disclosure.

Associating the plurality of subevents of the bespoke journey with the plurality of journey stages may include associating the completion of particular subevents and identifying particular sentiment associated with the bespoke journey with particular journey stages. For example, a user (e.g., user 42) may associate the plurality of subevents (e.g., subevents 304, 306, 308, 310, 312) from the bespoke journey (e.g., bespoke journey 300) and/or user sentiment associated with the bespoke journey during the various subevents with the plurality of journey stages (e.g., journey stages 800, 802, 804, 806, 808). For example, change management process 10 may associate one or more sentiment metrics concerning the bespoke journey at various stages of the bespoke journey with specific journey stages. In one example, one or more sentiment metrics from a recipient may be processed to gauge sentiment during the bespoke journey. In this manner, each journey stage may include one or more sentiment metrics to gauge an individual's stage of change.

For example, sentiment may be used to help further determine an individual's progress in the business process transition (e.g., business process transition event 100) in terms of a journey stage of a plurality of journey stages. For the precontemplation journey stage, change management process 10 may determine whether communications from a particular recipient indicate that the user has expressed positive sentiment regarding the business process transition or whether the user has expressed negative sentiment regarding the business process transition during this initial subevents of the bespoke journey. For the contemplation journey stage, change management process 10 may determine whether communications from a recipient indicate that the user is ready to engage with the business process transition or whether the user has expressed negative sentiment regarding further implementation of the business process transition event. For the planning journey stage, change management process 10 may determine whether communications from a recipient indicate that the user is actively planning for participation in the business process transition event or whether the user has expressed negative sentiment regarding planning for participation in the business process transition event. For the action journey stage, change management process 10 may determine whether communications from a recipient indicate that the user is engaging in the business process transition event or whether the user has expressed negative sentiment regarding further participation in the business process transition event. For the maintenance journey stage, change management process 10 may determine whether communications from a recipient indicate that the user is seeking to maintain their progress in the business process transition event or whether the user has expressed negative sentiment regarding ongoing efforts for participating in the business process transition event. While examples of particular sentiments for specific journey stages have been described, it will be appreciated that various sentiment metrics may be utilized to determine a particular journey stage for an individual recipient of the bespoke journey (e.g., bespoke journey 300).

As will be discussed in greater detail below, change management process 10 may interact with each recipient based upon, at least in part, the journey stage associated with the recipient. In this manner, change management process 10 may adaptively and automatically communicate with particular recipients in a manner that will increase the likelihood of a successful transition from a first business process (e.g., first business process 102) to a second business process (e.g., second business process 104).

Change management process 10 may provide 702 information concerning the bespoke journey (e.g., bespoke journey 300) to a plurality of recipients participating in the business process transition event (e.g., business process transition event 100). As discussed above, change management process 10 may provide 224 information (e.g., information 118) concerning the bespoke journey (e.g., bespoke journey 300) to a plurality of recipients (e.g., plurality of recipients 120) participating in the business process transition event (e.g., business process transition event 100). Examples of information 118 may include but are not limited to: schedules concerning bespoke journey 300 and/or business process transition event 100, deadlines concerning bespoke journey 300 and/or business process transition event 100, timelines concerning bespoke journey 300 and/or business process transition event 100, supplemental informational resources concerning bespoke journey 300 and/or business process transition event 100, contact information concerning bespoke journey 300 and/or business process transition event 100, help resources concerning bespoke journey 300 and/or business process transition event 100, and informational links concerning bespoke journey 300 and/or business process transition event 100.

Change management process 10 may monitor 704 progress of the plurality of recipients with respect to the bespoke journey (e.g., bespoke journey 300) to associate each of the plurality of recipients with one of the journey stages. For example, suppose that change management process 10 provides 702 information concerning the bespoke journey (e.g., bespoke journey 300) to a plurality of recipients (e.g., plurality of recipients 120). Further suppose that plurality of recipients 120 includes user 38 and user 40. In this example, change management process 10 may monitor 704 the progress of user 38 and user 40. Suppose that user 38 and user 40 are provided with similar event roadmaps (e.g., event roadmap 302) corresponding to similar roles in the second business process. Suppose that user 38 completes several subevents (e.g., subevents 304, 306, 308) while user 40 only completes a single subevent (e.g., subevent 304) over a given period of time. Continuing with the above association of journey stages 800, 802, 804, 806, 808 with subevents 304, 306, 308, 310, 312, change management process 10 may associate user 38 with preparation journey stage 804 and user 40 with contemplation journey stage 800.

When monitoring 704 progress of the plurality of recipients with respect to the bespoke journey (e.g., bespoke journey 300) to associate each of the plurality of recipients with one of the journey stages, change management process 10 may monitor 706 the plurality of recipients to gauge their adherence to one or more deadlines associated with one or more of the plurality of subevents. Continuing with the above example, suppose that user 38 completes several subevents (e.g., subevents 304, 306, 308) while user 40 only completes a single subevent (e.g., subevent 304) over a given period of time. Now suppose that user 38 completes subevents 304, 306, 308 and adheres to the deadlines associated with subevents 304, 306, 308 and that while user 40 completes subevent 304, user 40 fails to adhere to the deadline associated with subevent 304. In this example, change management process 10 may associate user 38 with preparation journey stage 804 based upon, at least in part, user 38's adherence to the deadlines associated with subevents 304, 306, 308. Similarly, change management process 10 may associate user 40 with preparation journey stage 800 based upon, at least in part, user 40's adherence to the deadlines associated with subevent 304. In this manner, a recipient's adherence to the deadlines associated with the plurality of subevents may be indicative of their progress with respect to the plurality of journey stages.

When monitoring 704 progress of the plurality of recipients with respect to the bespoke journey (e.g., bespoke journey 300) to associate each of the plurality of recipients with one of the journey stages, change management process 10 may reassociate 708 one or more of the plurality of recipients from a first journey stage to a second journey stage. Continuing with the above example, suppose that user 38 completes an additional subevent (e.g., subevent 310) while user 40 completes an additional subevent (e.g., subevent 306). Now suppose that user 38 completes subevents 304, 306, 308 adheres to the deadlines associated with subevents 304, 306, 308 and that while user 40 completes subevent 304, user 40 fails to adhere to the deadline associated with subevents 304, 306, 308. In this example, change management process 10 may associate user 38 with preparation journey stage 804 based upon, at least in part, user 38's adherence to the deadlines associated with subevents 304, 306, 308. Similarly, change management process 10 may associate user 40 with preparation journey stage 800 based upon, at least in part, user 40's adherence to the deadlines associated with subevent 304. In this manner, a recipient's adherence (or lack thereof) to the deadlines associated with the plurality of subevents may be indicative of their progress with respect to the plurality of journey stages.

As discussed above, change management process 10 may monitor 510 the plurality of recipients to gauge sentiment concerning the bespoke journey (e.g., bespoke journey 300). For example, change management process 10 may process 512 communications (e.g., communications 124) from the plurality of recipients (e.g., plurality of recipients 120) by performing sentiment analysis on communications 124. In some implementations, change management process 10 may perform sentiment analysis on one or more portions of the communications (e.g., communications 124) from the plurality of recipients (e.g., plurality of recipients 120) to define the one or more sentiment metrics using a machine learning model (e.g., machine learning model 126) configured to analyze communications 124 and determine sentiment of portions of communications 124. In addition to utilizing machine learning models, change management process 10 may utilize various artificial intelligence engines (e.g., artificial intelligence engine 106) to determine sentiment of portions of communications from the plurality of recipients within the scope of the present disclosure.

Change management process 10 may utilize the recipient's sentiment concerning the bespoke journey to associate each of the plurality of recipients with one of the journey stages. For example and as discussed above, the plurality of journey stages may define discrete collections of characteristics, behaviors, or experiences that describe an individual's progress through a journey. Using a recipient's sentiment, change management process 10 may associate the recipient with a particular journey stage.

Continuing with the above example, suppose that user 38 completes several subevents (e.g., subevents 304, 306, 308) while user 40 only completes a single subevent (e.g., subevent 304) over a given period of time. Further suppose that change management process 10 processes 512 communications from user 38 and determines a positive sentiment indicative that user 38 is actively engaging in the business process transition event. In this example, change management process 10 may associate user 38 with the e.g., action journey stage (e.g., action journey stage 806) based upon, at least in part, user 38's progress with the bespoke journey (e.g., bespoke journey 300) and user 38's positive sentiment indicative that user 38 is actively engaging in the business process transition event.

Now suppose that change management process 10 processes 512 communications from user 40 and determines a negative sentiment indicative that user 40 is struggling to see the value in the business process transition event. In this example, change management process 10 may associate user 40 with the e.g., contemplation journey stage (e.g., contemplation journey stage 802) based upon, at least in part, user 40's progress with the bespoke journey (e.g., bespoke journey 300) and user 40's negative sentiment indicative that user 40 is struggling to see the value in the business process transition event. While two examples of how a recipient's sentiment may be utilized to associate the recipient with a particular journey stage have been described above, it will be appreciated that these are for example purposes only and that various recipient sentiments at any point in the bespoke journey may be utilized to associate the recipients with particular journey stages within the scope of the present disclosure. For example, change management process 10 may maintain a database of mappings between recipient sentiment, subevents, and journey stages.

In response to associating the plurality of recipients with one of the journey stages, change management process 10 may implement a remedial action based upon, at least in part, the journey stage of a recipient. Continuing with the above example, suppose that user 38 is associated with the action journey stage (e.g., action journey stage 806) and the user 40 is associated with the contemplation journey stage (e.g., contemplation journey stage 802). In this example, user 38 may be on track for the business process transition event (e.g., business process transition event 100). Accordingly, change management process 10 may provide communications (e.g., subevent reminders, notifications, etc.) to user 38 configured to help user 38 advance to the next journey stage (e.g., maintenance journey stage 808). In this example, change management process 10 may populate the communications to user 38 with information associated with the transition from e.g., action journey stage 806 to e.g., maintenance journey stage 808. For example, change management process 10 may access a database of predefined phrases associated with the current journey stage and the next journey stage when populating the communications to user 38.

However, user 40 may not be on track for the business process transition event (e.g., business process transition event 100). Accordingly, change management process 10 may provide communications (e.g., subevent reminders, notifications, etc.) to user 40 configured to help user 40 advance to the next journey stage (e.g., planning journey stage 804). In this example, change management process 10 may populate the communications to user 40 with information associated with the transition from e.g., contemplation journey stage 802 to e.g., planning journey stage 804. As discussed above, change management process 10 may access a database of predefined phrases associated with the current journey stage and the next journey stage when populating the communications to user 40. In this manner, change management process 10 may automatically gauge user sentiment and provide sentiment-aware communications in real-time to the plurality of recipients.

Virtual Chatbot for use in Journeys

Figure 10:
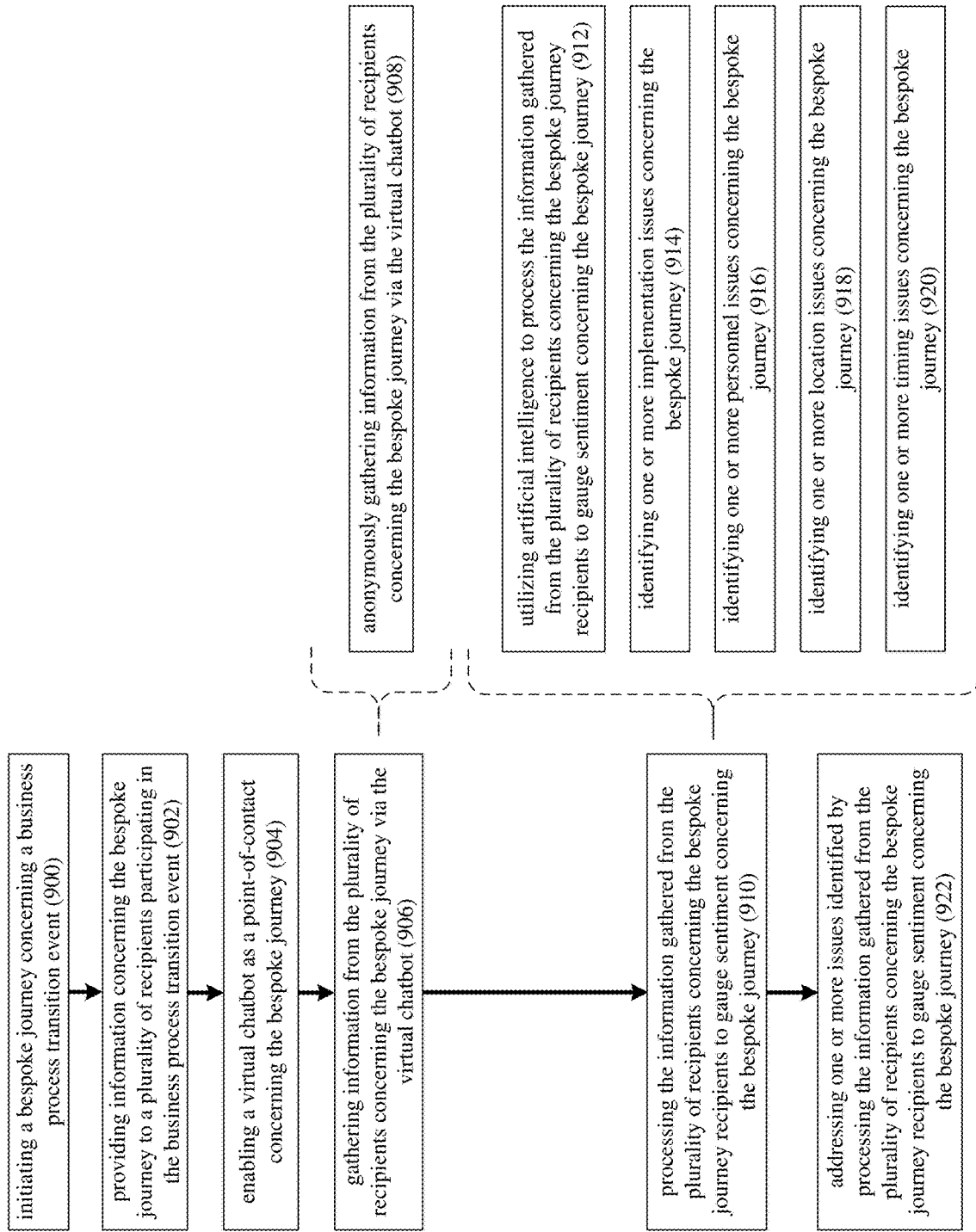
FIG. 10 is another flowchart of the change management process of FIG. 1 according to an embodiment of the present disclosure.

Referring also to FIG. 10 and as discussed above, change management process 10 may initiate 900 a bespoke journey (e.g., bespoke journey 300) concerning a business process transition event (e.g., business process transition event 100) and may provide 902 information (e.g., information 118) concerning the bespoke journey (e.g., bespoke journey 300) to a plurality of recipients (e.g., plurality of recipients 120) participating in the business process transition event (e.g., business process transition event 100).

In some implementations, communicating with the plurality of recipients may be challenging when there are hundreds or thousands of participants in a business process transition event (e.g., business process transition event 100). For example, conventional approaches to resolving user or participant issues may require a dedicated call center with individuals dedicated to resolving issues concerning the bespoke journey (e.g., bespoke journey 300). However, the effectiveness of a dedicated call center may be subject to bottlenecks associated with widespread errors or limited number of call center staff. As such, the ability for recipients to successfully transition between business processes may be hampered by these issues. Accordingly, change management process 10 may provide a plurality of virtual chatbots configured to communicate with individual participants of the business process transition event in real-time. Additionally and as will be discussed in greater detail below, these virtual chatbots may be configured to provide sentiment-aware responses to individual participants.

Figure 11:
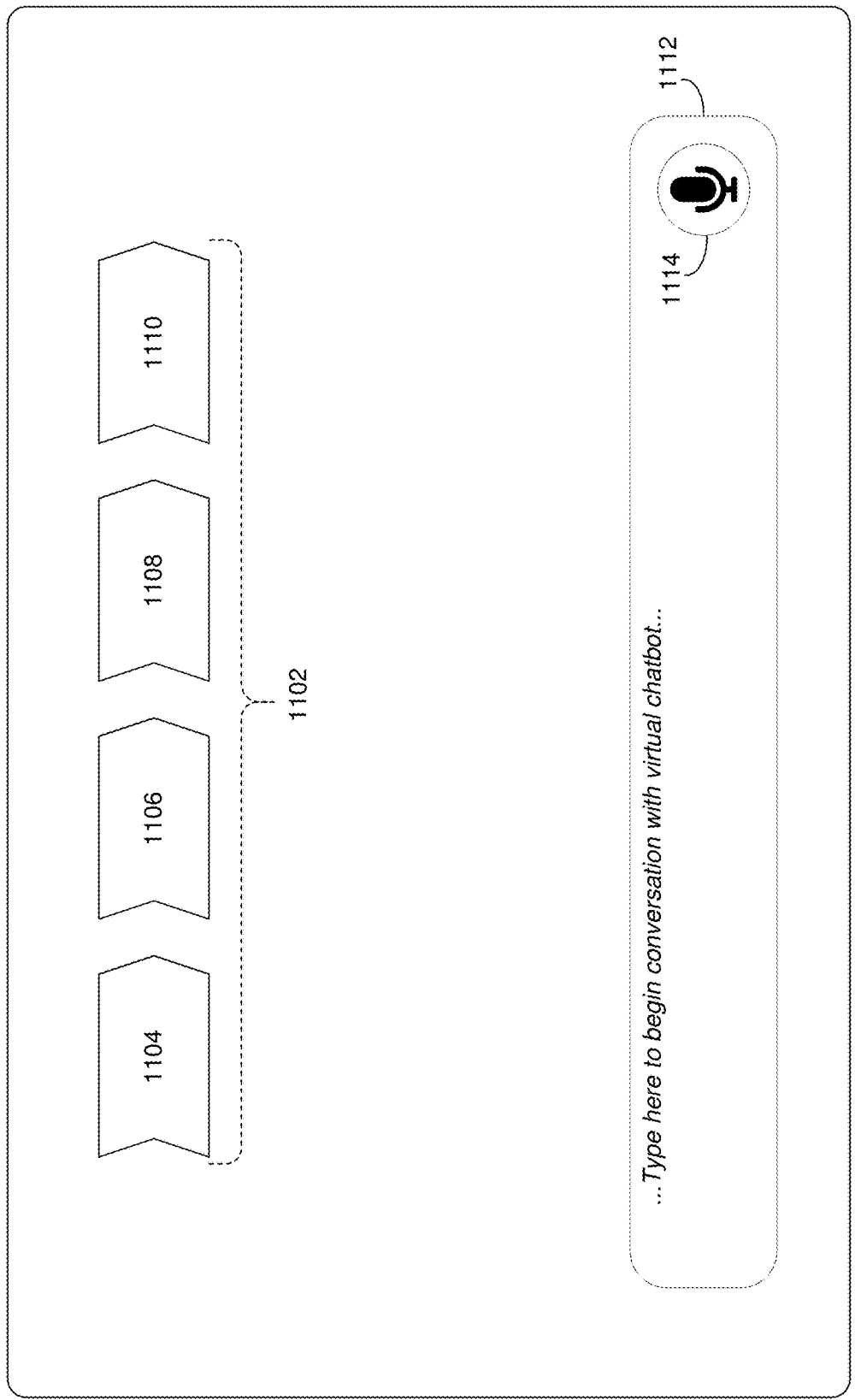
FIGS. 11-12 are diagrammatic views of a user interface generated by the change management process of FIG. 1 for generating a journey according to an embodiment of the present disclosure.

Referring also to FIG. 11, change management process 10 may enable 904 a virtual chatbot as a point-of-contact concerning the bespoke journey. For example, a virtual chatbot (e.g., virtual chatbot 130) may generally include a computer program configured to simulate a human conversation through speech signals, text communication, or both. Enabling 904 a virtual chatbot (e.g., virtual chatbot 130) may include providing an option for a user to initiate a conversation with virtual chatbot 130. For example, user interface 1100 may include a visual representation of the event roadmap (e.g., event roadmap 1102 of subevents 1104, 1106, 1108, 1110) of the bespoke journey (e.g., bespoke journey 300) and a text box (e.g., text box 1102) for initiating a virtual chatbot (e.g., virtual chatbot 130). As shown in FIG. 11, user interface 1100 may include a button (e.g., button 1114) for initiating a speech-based conversation with virtual chatbot 130. In some implementations, virtual chatbot 130 may be automatically enabled 904 by change management process 10 in response to providing 902 information (e.g., information 118) concerning the bespoke journey (e.g., bespoke journey 300) to a plurality of recipients (e.g., plurality of recipients 120) participating in the business process transition event (e.g., business process transition event 100).

As discussed above, change management process 10 may monitor 504 the plurality of recipients to gauge their adherence to the event roadmap. For example, when monitoring 504 the plurality of recipients (e.g., plurality of recipients 120) to gauge their adherence to the event roadmap (e.g., event roadmap 302), change management process 10 may monitor 506 the plurality of recipients (e.g., plurality of recipients 120) to gauge their adherence to one or more deadlines associated with one or more of the plurality of subevents (e.g., subevents 304, 306, 308, 310, 312). Suppose that a recipient (e.g., user 38) completes subevents 304, 306, 308 and adheres to the deadlines associated with subevents 304, 306, 308 and that while user 40 completes subevent 304, user 40 fails to adhere to the deadline associated with subevent 304. Change management process 10 may provide, via virtual chatbot 130, one or more specific messages concerning the bespoke journey (e.g., bespoke journey 300) based on the recipients' progress. In this example, change management process 10 may provide one or more messages to user 38 concerning the next subevent (e.g., subevent 310) of bespoke journey 300 for user 38 and to user 40 concerning the next subevent (e.g., subevent 304) of bespoke journey 300 for user 40. In addition and as discussed above, change management process 10 may implement 508 a remedial action if is determined that one or more of the plurality of recipients has failed to adhere to one or more deadlines associated with one or more of the plurality of subevents.

Examples of the remedial action (e.g., remedial action 122) may include but are not limited to one of more of:
- sending a reminder, via virtual chatbot 130, to e.g., one or more of the plurality of recipients 120 who are not adhering to the deadline(s) associated with one or more of the plurality of subevents (e.g., subevents 304, 306, 308, 310, 312);
- initiating an inquiry, via virtual chatbot 130, to e.g., one or more of the plurality of recipients 120 who are not adhering to the deadline(s) associated with one or more of the plurality of subevents (e.g., subevents 304, 306, 308, 310, 312);
- initiating contact, via virtual chatbot 130, with e.g., one or more of the plurality of recipients 120 who are not adhering to the deadline(s) associated with one or more of the plurality of subevents (e.g., subevents 304, 306, 308, 310, 312); and notifying a supervisor, via virtual chatbot 130, of e.g., one or more of the plurality of recipients 120 who are not adhering to the deadline(s) associated with one or more of the plurality of subevents (e.g., subevents 304, 306, 308, 310, 312).

Change management process 10 may gather 906 information from the plurality of recipients concerning the bespoke journey (e.g., bespoke journey 300) via the virtual chatbot. For example, change management process 10 may gather 906 information (e.g., information 132), via the virtual chatbot (e.g., virtual chatbot 130), in response to a user initiating virtual chatbot 130 and/or in response to determining a need for information from the plurality of recipients (e.g., plurality of recipients 120) concerning the bespoke journey (e.g., bespoke journey 300).

Figure 12:
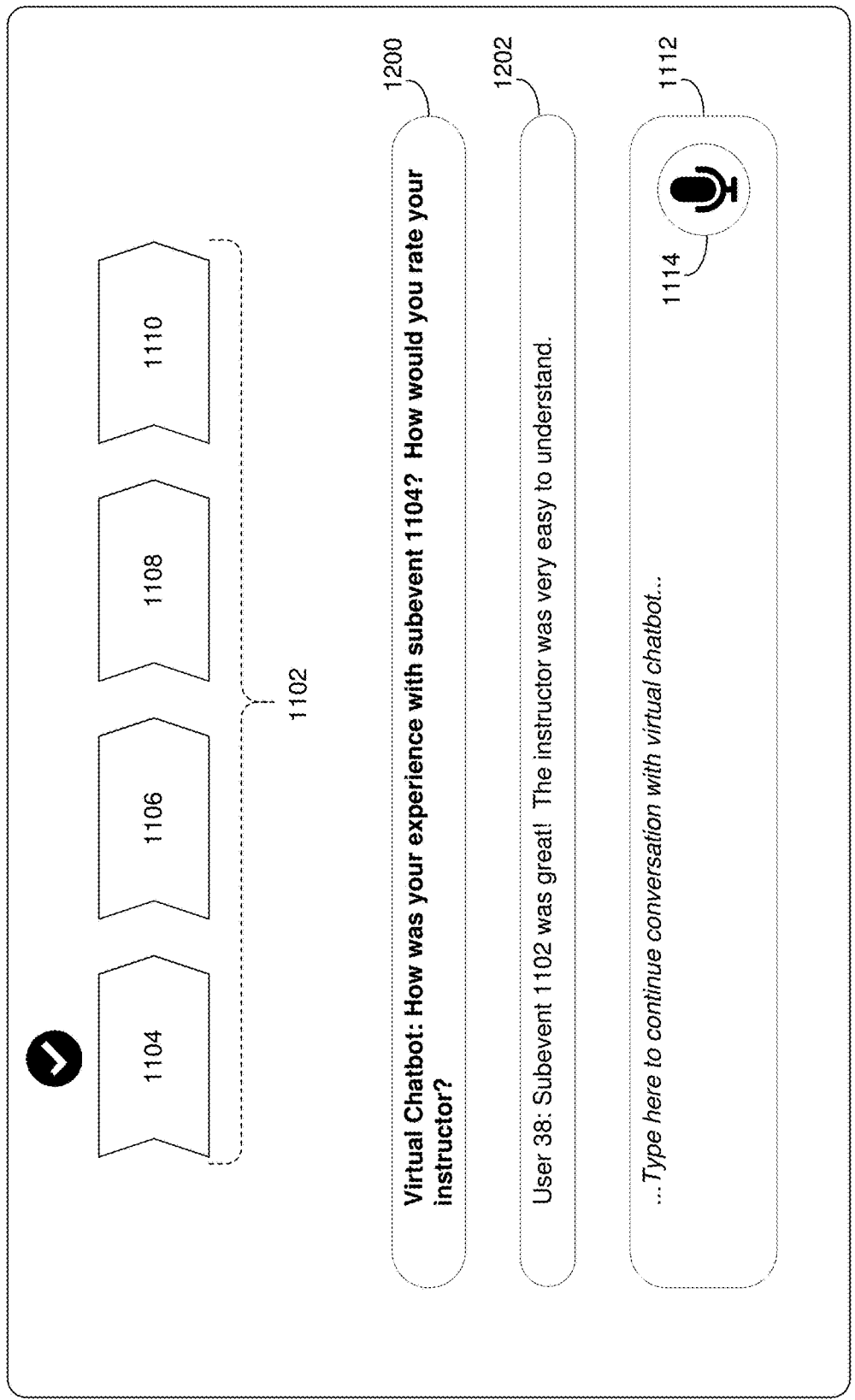

Referring also to FIG. 12, suppose that change management process 10 determines that user 38 has recently completed subevent 1104. In this example, change management process 10 may solicit feedback from user 38 concerning subevent 1104 by providing one or more prompts (e.g., prompt 1200). Accordingly, user 38 may respond to prompt 1200 with information 1202. Virtual chatbot 130 may iteratively prompt user 38 for additional information until change management process 10 determines that no further information is needed.

When gathering 906 information from the plurality of recipients concerning the bespoke journey (e.g., bespoke journey 300) via the virtual chatbot, change management process 10 may anonymously gather 908 information from the plurality of recipients concerning the bespoke journey (e.g., bespoke journey 300) via the virtual chatbot. For example, suppose that change management process 10 receives information from other recipients concerning particular subevents of bespoke journey 300. In this example, change management process 10 may solicit additional information from other attendees (e.g., user 38) of the particular subevents. As shown in FIG. 12, virtual chatbot 130 may prompt user 38 for information concerning subevent 1104. In this example, change management process 10 may process information (e.g., information 132) provided by user 38 anonymously using virtual chatbot 130.

Change management process 10 may process 910 the information gathered from the plurality of recipients concerning the bespoke journey (e.g., bespoke journey 300) recipients to gauge sentiment concerning the bespoke journey. As discussed above, change management process 10 may process 512 information (e.g., information 132) from the plurality of recipients (e.g., plurality of recipients 120) by performing sentiment analysis on information 132.

When processing 910 the information gathered from the plurality of recipients concerning the bespoke journey (e.g., bespoke journey 300) recipients to gauge sentiment concerning the bespoke journey, change management process 10 may utilize 912 artificial intelligence to process the information (e.g., information 132) gathered from the plurality of recipients concerning the bespoke journey (e.g., bespoke journey 300) recipients to gauge sentiment concerning the bespoke journey. For example, change management process 10 may perform sentiment analysis on one or more portions of the information (e.g., information 132) from the plurality of recipients (e.g., plurality of recipients 120) to define the one or more sentiment metrics using a machine learning model (e.g., machine learning model 126) configured to analyze information 132 and determine sentiment of portions of information 132.

When processing 910 the information gathered from the plurality of recipients concerning the bespoke journey (e.g., bespoke journey 300) recipients to gauge sentiment concerning the bespoke journey, change management process 10 may:
- identify 914 one or more implementation issues concerning the bespoke journey (e.g., bespoke journey 300);
- identify 916 one or more personnel issues concerning the bespoke journey (e.g., bespoke journey 300);
- identify 918 one or more location issues concerning the bespoke journey (e.g., bespoke journey 300); and/or
- identify 920 one or more timing issues concerning the bespoke journey (e.g., bespoke journey 300).

While various types of identifiable issues have been described, it will be appreciated that these are for example purposes only and that any type of issue may be identified by change management process 10 within the scope of the present disclosure.

Suppose that a plurality of recipients (e.g., user 38 and user 40) interact with a virtual chatbot (e.g., virtual chatbot 130). In this example, change management process 10 may gather 906 information (e.g., information 132) from the plurality of recipients (e.g., user 38 and user 40) concerning the bespoke journey (e.g., bespoke journey 300) recipients to gauge sentiment concerning the bespoke journey. Suppose that change management process 10 identifies positive sentiment in the information provided by user 38 and negative sentiment in the information provided by user 40 concerning the bespoke journey (e.g., bespoke journey 300). In this example, change management process 10 may adapt the responses from virtual chatbot 130 to account for the identified sentiments of user 38 and user 40. For example, virtual chatbot 130 may be configured to provide encouraging and supportive responses to user 38 while virtual chatbot 130 may provide more questions to user 40 to help resolve the identified negative sentiment. In this manner, virtual chatbot 130 may be configured to adapt to a recipient's identified sentiment.

Change management process 10 may address 922 one or more issues identified by processing the information gathered from the plurality of recipients concerning the bespoke journey (e.g., bespoke journey 300) recipients to gauge sentiment concerning the bespoke journey. For example, addressing 922 the one or more issues identified by monitoring the plurality of recipients (e.g., plurality of recipients 120) to gauge sentiment concerning the bespoke journey (e.g., bespoke journey 300) may include providing automatically generated recommendations regarding the one or more issues. For example, change management process 10 may provide one or more notifications regarding the one or more issues to a user (e.g., user 42) managing the bespoke journey (e.g., bespoke journey 300), a supervisor of an individual associated with the one or more issues, and/or various participants of a particular event soliciting further feedback on the one or more issues. With the one or more notifications, change management process 10 may provide recommendations based on the one or more issues. For example, change management process 10 may:
- provide a recommendation to shorten the curriculum of a training seminar that people thought was too long;
- provide a recommendation to replace an instructor at a seminar that people thought was ineffective;
- provide a recommendation to relocate a staff meeting from a room that people thought was drafty and cold; and/or
- provide a recommendation to reschedule a training session that was scheduled to last until 8:00 p.m. and people thought was too late.

Accordingly, change management process may automatically identify and address 922 one or more issues identified by monitoring the plurality of recipients (e.g., plurality of recipients 120) to gauge sentiment concerning the bespoke journey (e.g., bespoke journey 300). By utilizing a virtual chatbot (e.g., virtual chatbot 130) and sentiment analysis, change management process 10 may allow for sentiment-aware conversations and issue resolution with hundreds or thousands of participants of a business process transition event (e.g., business process transition event 100) in real-time. In this manner, real-time, sentiment-aware communication may be provided by virtual chatbots to multiple participants of the business process transition event simultaneously.

Generating and Deploying Journey Events Via a Template

Figure 13:
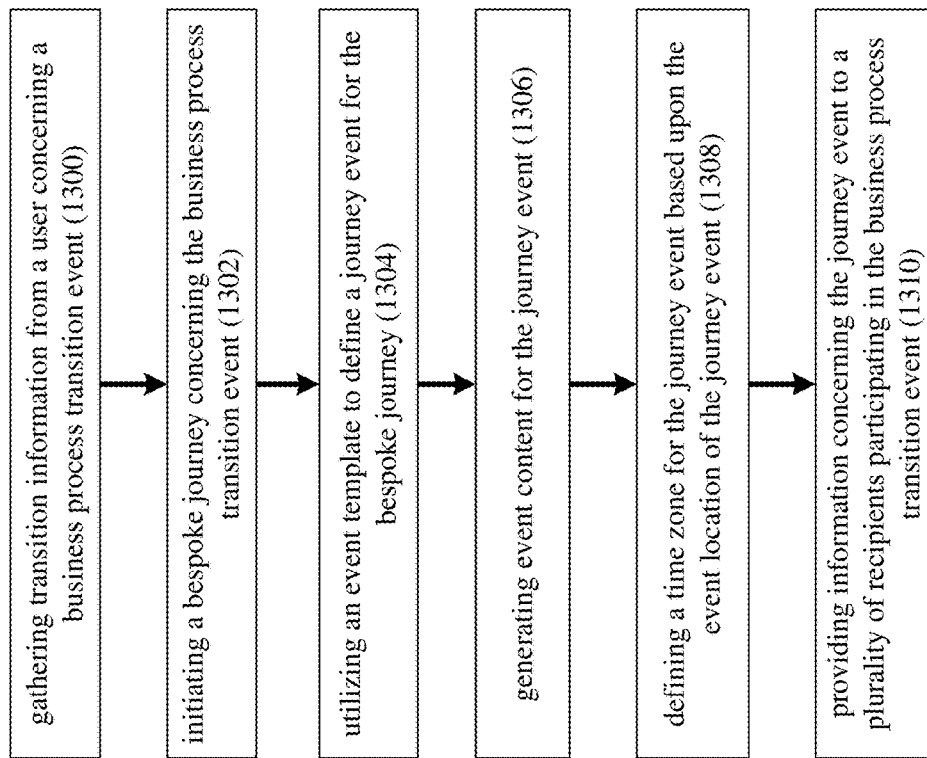
FIG. 13 is another flowchart of the change management process of FIG. 1 according to an embodiment of the present disclosure.

Referring also to FIG. 13 and as discussed above, change management process 10 may gather 1300 transition information (e.g., transition information 108) from a user (e.g., user 42) concerning a business process transition event (e.g., business process transition event 100) and may initiate 1302 a bespoke journey (e.g., bespoke journey 300) concerning the business process transition event (e.g., business process transition event 100).

In some implementations, the deployment of a bespoke journey (e.g., bespoke journey 300) concerning the business process transition event (e.g., business process transition event 100) may be constrained by the time required to develop the various portions or subevents of the bespoke journey (e.g., bespoke journey 300). For example, a business transition event may require various events and/or subevents (e.g., subevents 304, 306, 308, 310, 312) in order to successfully transition participants from a first business process to a second business process. Accordingly, the process of generating bespoke journeys and separately generating hundreds or thousands events with particular content for the bespoke journey may require significant resources (i.e., development time, computing resources, etc.). As will be discussed in greater detail below, change management process 10 may provide the ability to generate and utilize event templates to define journey events for the bespoke journey by mapping data within the bespoke journey to particular event content. Additionally, by generating journey events from event templates within a bespoke journey, information associated with the journey event may be automatically associated with and tracked for participants of the bespoke journey. In this manner, journey events may be generated more efficiently with fewer resources and without requiring the creation or editing of event content in separate applications or programs. Further, information generated for and during journey events may be automatically associated with particular participants and their progress with respect to the bespoke journey.

Figure 14:
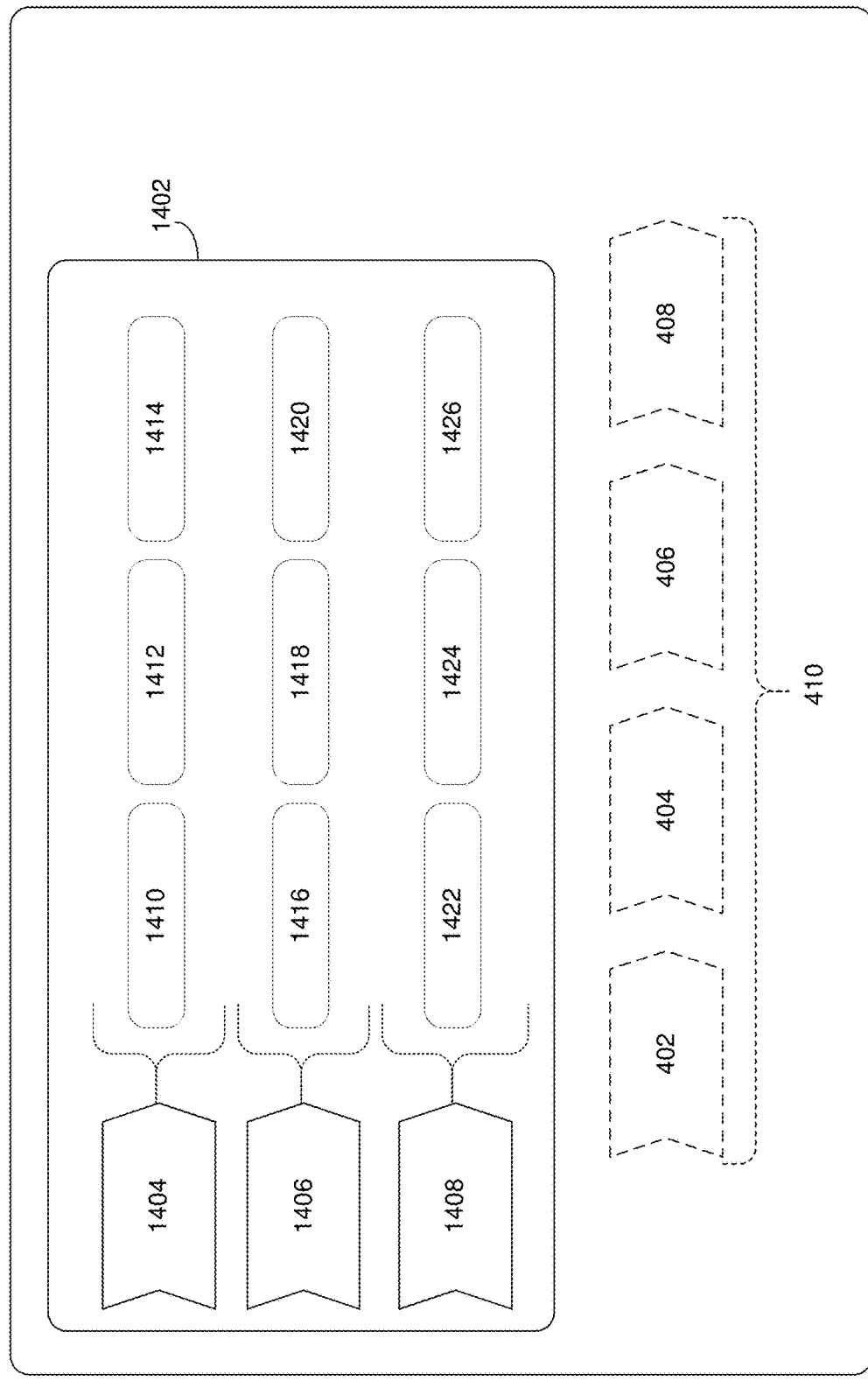
FIG. 14 is a diagrammatic view of a user interface generated by the change management process of FIG. 1 for utilizing event templates according to an embodiment of the present disclosure.

Referring also to FIG. 14, change management process 10 may utilize 1304 an event template to define a journey event for the bespoke journey. For example, change management process 10 may provide a user interface (e.g., user interface 1400) that is configured to allow a user to define a bespoke journey (e.g., bespoke journey 300). As discussed above, bespoke journey 300 may include an event roadmap (e.g., event roadmap 410) formed from a plurality of events or subevents (e.g., subevents 402, 404, 406, 408). In this example, subevents 402, 404, 406, 408 are rendered in broken lines to represent event placeholders for potential events of bespoke journey 300.

As shown in FIG. 14, user interface 1400 may include a window (e.g., window 1402) with a plurality of event templates (e.g., event templates 1404, 1406, 1408). Event templates (e.g., event templates 1404, 1406, 1408) may generally include user-configurable events of a bespoke journey (e.g., bespoke journey 300). For example, specific event content may be generated for each event template to define a journey event for the bespoke journey (e.g., bespoke journey 300). As discussed above, examples of the plurality of events or subevents (e.g., subevents 304, 306, 308, 310, 312) may include but are not limited to one or more of:

a deadline event, wherein a deadline may be defined concerning bespoke journey 300 and/or business process transition event 100;

a milestone event, wherein a milestone may be defined concerning bespoke journey 300 and/or business process transition event 100;

a general condition event, wherein a required condition may be defined concerning bespoke journey 300 and/or business process transition event 100;

a subsequent condition event, wherein a condition may be defined that occurs after (i.e., subsequent to) a specific event concerning bespoke journey 300 and/or business process transition event 100;

a precedent condition event, wherein a condition may be defined that occurs before (i.e., prior to) a specific event concerning bespoke journey 300 and/or business process transition event 100;

a communication event (e.g., a meeting/seminar) concerning bespoke journey 300 and/or business process transition event 100;

an information distribution event (e.g., a flyer/document) concerning bespoke journey 300 and/or business process transition event 100;

a training event (e.g., a seminar/class/tutorial) concerning bespoke journey 300 and/or business process transition event 100;

a feedback submission event (e.g., a form/email address/telephone number/chatbot) concerning bespoke journey 300 and/or business process transition event 100;

a discontinuation-of-use event (e.g., a notification that use of first business process 102 has ceased) concerning bespoke journey 300 and/or business process transition event 100;

an initiation-of-use event (e.g., a notification that use of second business process 104 has begun) concerning bespoke journey 300 and/or business process transition event 100; and a transition-of-use event (e.g., a notification that first business process 102 is currently being transitioned to second business process 104) concerning bespoke journey 300 and/or business process transition event 100.

Accordingly, event templates 1404, 1406, 1408 may include configurable deadline events, milestone events, general condition events, etc. In this manner, event templates 1404, 1406, 1408 may be generated for any type of event or subevent within the scope of the present disclosure.

Change management process 10 may generate 1306 event content for the journey event. For example and as shown in FIG. 14, change management process 10 may provide a user interface (e.g., user interface 1400) configured to allow a user to define or generate a plurality of event templates (e.g., event templates 1404, 1406, 1408). With a selection of one or more of the plurality of event templates 1404, 1406, 1408, user interface 1400 may receive event content for a specific journey event. For example, suppose that a user (e.g., user 42) is generating a bespoke journey (e.g., bespoke journey 300) for a plurality of participants (e.g., plurality of recipients 120). Further suppose that bespoke journey 300 includes e.g., four subevents as part of the business process transition event (e.g., business process transition event 100). In this example, suppose that bespoke journey 300 includes event roadmap 410 with e.g., three virtual training sessions and one in-person training session. Suppose that the three virtual training sessions include a similar format but with different presentations by distinct presenters.

Continuing with the above example, as opposed to generating three entirely separate virtual training sessions with an external application, user 42 may utilize 1304 an event template (e.g., event template 1404) to define a journey event (e.g., journey event 402) with event content specific to one of the virtual training sessions. For example, user 42 may generate 1306 event content (e.g., event content 1410, 1412, 1414) for the journey event (e.g., journey event 402) for a first virtual training session. As the other two virtual training sessions have the same format as the first virtual training session (e.g., journey event 402), user 42 may utilize 1304 event template 1404 and/or journey event 402 to generate 1306 event content (e.g., event content 1416, 1418, 1420) for the journey event (e.g., journey event 404) for a second virtual training session. Similarly, user 42 may utilize 1304 event template 1404 and/or journey events 402 and 404 to generate 1306 event content (e.g., event content 1422, 1424, 1426) for the journey event (e.g., journey event 406) for a third virtual training session.

When generating 1306 event content for the journey event, change management process 10 may generate web-accessible event resources automatically from the event template and generated event content. In this manner, a user may select or create a particular event template, generate event content for the event template, and generate journey events using the event template and event content associated with the event template.

In some implementations, the journey event may be associated with an event location. For example, when utilizing 1304 an event template to define a journey event, change management process 10 may define 1308 a time zone for the journey event based upon the event location of the journey event. Continuing with the above example, suppose that the first virtual training session of bespoke journey 300 is associated with an event location (e.g., a virtual location and time zone associated with the virtual location or a physical location and time zone associated with the physical location). In this example, change management process 10 may define 1308 a time zone for journey event 402. For example, suppose that event content 1410 is associated with event timing information for the virtual training session (e.g., start and end time; time zone; etc.). Using the defined time zone, change management process 10 may synchronize event timing information across time zones associated with particular recipients. In this example, when recipients participating in the business process transition event are invited to participate in the first virtual training session of journey event 402, the event timing information defined for journey event 402 may be synchronized for each recipient based on their respective time zone.

In some implementations, change management process 10 may define a default time zone for the event template that may be modified for particular journey events generated from the event template. For example, when utilizing 1304 event template 1404, user 42 may generate 1306 event content including a default time zone. Accordingly, each journey event generated from event template 1404 may include the predefined default time zone.

Change management process 10 may provide 1310 information concerning the journey event to a plurality of recipients participating in the business process transition event. The plurality of recipients participating in the business process transition event (e.g., business process transition event 100) may include one or more of: a presenter at the journey event; a participant at the journey event; an attendee of the journey event; a supervisor of the journey event; and an organizer of the journey event. Depending on the type of journey event, change management process 10 may provide 1310 an invitation to participate in the journey event; a notification of the journey event; a reminder concerning the journey event; a notification to a supervisor regarding the opportunity for particular recipients to participant in the journey event; etc. In some implementations, the information (e.g., information 134) concerning the journey event may be provided within a graphical user interface provided to each recipient showing their bespoke journey (e.g., bespoke journey 300) and the event roadmap of the bespoke journey. In this manner, a participant of the business process transition event (e.g., business process transition event 100) may visualize and interact with information 134 concerning the upcoming events of the bespoke journey (e.g., bespoke journey 300).

As the plurality of recipients (e.g., plurality of recipients 120) participate in the plurality of journey events, change management process 10 may receive information (e.g., information 136) associated with the plurality of recipients as the plurality of recipients participate in the plurality of journey events. For example, suppose a user (e.g., user 38) participates in a virtual training session (e.g., journey event 402). In this example, user 38 may provide (e.g., via a virtual chat functionality within journey event 402), feedback regarding the business process transition event (e.g., business process transition event 100) and user 38's progress with respect to the bespoke journey (e.g., bespoke journey 300). Accordingly, change management process 10 may associate this information (e.g., information 136) with user 38 and use the information to e.g., gauge user 38's sentiment; monitor user 38's progress with respect to the bespoke journey (e.g., bespoke journey 300); identify and address issues raised by or in light of user 38's participation in journey event 402. In this manner, change management process 10 may utilize information (e.g., information 136) associated with the plurality of recipients generated as the plurality of recipients participate in the plurality of journey events to dynamically adjust the bespoke journey. For example, change management process 10 may automatically populate and/or update bespoke journey 300 of a particular participant in real-time as the participant interacts with the journey event.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
  initiating a bespoke journey concerning a business process transition event, wherein the business process transition event includes a business process transition event from one or more role-based functionalities associated with a first business process to one or more role-based functionalities associated with a second business process;
providing information concerning the bespoke journey to a plurality of recipients participating in the business process transition event, wherein the bespoke journey includes a plurality of subevents configured to guide the user through the business process transition event for each recipient based upon, at least in part, the recipient's role and the one or more role-based functionalities associated with the second business process, wherein the plurality of subevents include one or more training events concerning the recipient's role and the one or more role-based functionalities associated with the second business process;
monitoring the plurality of recipients to gauge sentiment concerning the bespoke journey, wherein monitoring the plurality of recipients to gauge sentiment concerning the bespoke journey includes:
using a virtual bot to receive anonymous communications from the plurality of recipients to gauge their sentiment concerning the bespoke journey;
iteratively prompting the plurality of users with the virtual bot via a user interface to provide communications concerning the bespoke journey until the virtual bot determines that no further information is needed;
processing the communications from the plurality of recipients utilizing artificial intelligence and natural language processing to perform sentiment analysis on the communications from the plurality of recipients to gauge sentiment concerning the bespoke journey, wherein the natural language processing allows the communications to be understood by a machine;
in response to monitoring negative sentiment concerning the bespoke journey, identifying one or more issues concerning the bespoke journey; and
automatically generating and providing one or more recommendations for addressing the one or more identified issues concerning the bespoke journey.

2. The computer-implemented method of claim 1 wherein the first business process includes one or more of:
a first operating platform;
a first software platform;
a first hardware platform;
a first operating environment; and
a first operational system.

3. The computer-implemented method of claim 1 wherein the second business process includes one or more of:
a second operating platform;
a second software platform;
a second hardware platform;
a second operating environment; and
a second operational system.

4. The computer-implemented method of claim 1 wherein the business process transition event concerns a transition event from a first business operational process to a second operational process.

5. The computer-implemented method of claim 1 wherein the communications from the plurality of recipients includes one or more of:
email-based communications;
social media-based communications;
SMS text-based communications;
verbal-based communications;
chatbot-based communications; and
feedback-based communications.

6. The computer-implemented method of claim 1 wherein identifying one or more issues concerning the bespoke journey include one or more of:
identifying one or more implementation issues concerning the bespoke journey;
identifying one or more personnel issues concerning the bespoke journey;
identifying one or more location issues concerning the bespoke journey; and
identifying one or more timing issues concerning the bespoke journey.

7. The computer-implemented method of claim 6 further comprising:
addressing the one or more issues identified by monitoring the plurality of recipients to gauge sentiment concerning the bespoke journey.

8. A computer program product residing on a non-transitory computer readable medium having a plurality of instructions stored thereon which, when executed by a processor, cause the processor to perform operations comprising:
initiating a bespoke journey concerning a business process transition event, wherein the business process transition event includes a business process transition event from one or more role-based functionalities associated with a first business process to one or more role-based functionalities associated with a second business process, wherein the first business process includes a first operating platform and the second business process includes a second operating platform;
providing information concerning the bespoke journey to a plurality of recipients participating in the business process transition event, wherein the bespoke journey includes a plurality of subevents configured to guide the user through the business process transition event for each recipient based upon, at least in part, the recipient's role and the one or more role-based functionalities associated with the second business process, wherein the plurality of subevents include one or more training events concerning the recipient's role and the one or more role-based functionalities associated with the second business process;
monitoring the plurality of recipients to gauge sentiment concerning the bespoke journey, wherein monitoring the plurality of recipients to gauge sentiment concerning the bespoke journey includes:
using a virtual bot to receive anonymous communications from the plurality of recipients to gauge their sentiment concerning the bespoke journey;
iteratively prompting the plurality of users with the virtual bot via a user interface to provide communications concerning the bespoke journey until the virtual bot determines that no further information is needed;
processing the communications from the plurality of recipients utilizing artificial intelligence and natural language processing to perform sentiment analysis on the communications from the plurality of recipients to gauge sentiment concerning the bespoke journey, wherein the natural language processing allows the communications to be understood by a machine;

in response to monitoring negative sentiment concerning the bespoke journey, identifying one or more issues concerning the bespoke journey; and
automatically generating and providing one or more recommendations for addressing the one or more identified issues concerning the bespoke journey.

9. The computer program product of claim 8 wherein the first business process includes one or more of:
a first software platform;
a first hardware platform;
a first operating environment; and
a first operational system.

10. The computer program product of claim 8 wherein the second business process includes one or more of:
a second software platform;
a second hardware platform;
a second operating environment; and
a second operational system.

11. The computer program product of claim 8 wherein the business process transition event concerns a transition event from a first business operational process to a second operational process.

12. The computer program product of claim 8 wherein the communications from the plurality of recipients includes one or more of:
email-based communications;
social media-based communications;
SMS text-based communications;
verbal-based communications;
chatbot-based communications; and
feedback-based communications.

13. The computer program product of claim 8 wherein identifying one or more issues concerning the bespoke journey include one or more of:
identifying one or more implementation issues concerning the bespoke journey;
identifying one or more personnel issues concerning the bespoke journey;
identifying one or more location issues concerning the bespoke journey; and
identifying one or more timing issues concerning the bespoke journey.

14. The computer program product of claim 13 further comprising:
addressing the one or more issues identified by monitoring the plurality of recipients to gauge sentiment concerning the bespoke journey.

15. A computing system including a processor and memory configured to perform operations comprising:
initiating a bespoke journey concerning a business process transition event, wherein the business process transition event includes a business process transition event from one or more role-based functionalities associated with a first business process to one or more role-based functionalities associated with a second business process, wherein the first business process includes a first software platform and the second business process includes a second software platform;
providing information concerning the bespoke journey to a plurality of recipients participating in the business process transition event, wherein the bespoke journey includes a plurality of subevents configured to guide the user through the business process transition event for each recipient based upon, at least in part, the recipient's role and the one or more role-based functionalities associated with the second business process, wherein the plurality of subevents include one or more training events concerning the recipient's role and the one or more role-based functionalities associated with the second business process;
monitoring the plurality of recipients to gauge sentiment concerning the bespoke journey, wherein monitoring the plurality of recipients to gauge sentiment concerning the bespoke journey includes:
using a virtual bot to receive anonymous communications from the plurality of recipients to gauge their sentiment concerning the bespoke journey;
iteratively prompting the plurality of users with the virtual bot via a user interface to provide communications concerning the bespoke journey until the virtual bot determines that no further information is needed;
processing the communications from the plurality of recipients utilizing artificial intelligence and natural language processing to perform sentiment analysis on the communications from the plurality of recipients to gauge sentiment concerning the bespoke journey, wherein the natural language processing allows the communications to be understood by a machine;
in response to monitoring negative sentiment concerning the bespoke journey, identifying one or more issues concerning the bespoke journey; and
automatically generating and providing one or more recommendations for addressing the one or more identified issues concerning the bespoke journey.

16. The computing system of claim 15 wherein the first business process includes one or more of:
a first operating platform;
a first hardware platform;
a first operating environment; and
a first operational system.

17. The computing system of claim 15 wherein the second business process includes one or more of:
a second operating platform;
a second hardware platform;
a second operating environment; and
a second operational system.

18. The computing system of claim 15 wherein the business process transition event concerns a transition event from a first business operational process to a second operational process.

19. The computing system of claim 15 wherein the communications from the plurality of recipients includes one or more of:
email-based communications;
social media-based communications;
SMS text-based communications;
verbal-based communications;
chatbot-based communications; and
feedback-based communications.

20. The computing system of claim 15 wherein identifying one or more issues concerning the bespoke journey include one or more of:
identifying one or more implementation issues concerning the bespoke journey;
identifying one or more personnel issues concerning the bespoke journey;
identifying one or more location issues concerning the bespoke journey; and
identifying one or more timing issues concerning the bespoke journey.

21. The computing system of claim 20 further comprising:
addressing the one or more issues identified by monitoring the plurality of recipients to gauge sentiment concerning the bespoke journey.

* * * * *